(12) United States Patent
Waltz

(10) Patent No.: US 12,391,069 B2
(45) Date of Patent: Aug. 19, 2025

(54) TRUMPET ARM WITH INTERNAL BUTTRESSES

(71) Applicant: Dana Heavy Vehicle Systems Group, LLC, Maumee, OH (US)

(72) Inventor: William F. Waltz, Toledo, OH (US)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 35 days.

(21) Appl. No.: 18/500,840

(22) Filed: Nov. 2, 2023

(65) Prior Publication Data

US 2025/0083475 A1 Mar. 13, 2025

Related U.S. Application Data

(60) Provisional application No. 63/582,182, filed on Sep. 12, 2023.

(51) Int. Cl.
| | |
|---|---|
| *B60B 35/16* | (2006.01) |
| *B60B 35/14* | (2006.01) |
| *B60K 1/00* | (2006.01) |
| *B60K 17/16* | (2006.01) |
| *F16H 48/24* | (2006.01) |

(Continued)

(52) U.S. Cl.
CPC .............. *B60B 35/16* (2013.01); *B60B 35/14* (2013.01); *B60K 1/00* (2013.01); *B60K 17/165* (2013.01); *F16H 48/24* (2013.01); *F16H 48/30* (2013.01); *F16H 57/021* (2013.01); *F16H 57/037* (2013.01); *B60B 35/166* (2013.01); *B60B 2310/202* (2013.01); *B60B 2310/206* (2013.01); *B60B 2310/228* (2013.01); *B60B 2360/102* (2013.01); *B60B 2360/104* (2013.01); *B60K 2001/001* (2013.01); *F16H 2057/02034* (2013.01); *F16H 2057/02052* (2013.01)

(58) Field of Classification Search
CPC .. B60B 35/166; B60B 35/16; B60K 2001/001
See application file for complete search history.

(56) References Cited

U.S. PATENT DOCUMENTS

| | | | | |
|---|---|---|---|---|
| 823,524 | A * | 6/1906 | Gray | ........................ B60B 35/16 |
| | | | | 74/391 |
| 916,888 | A * | 3/1909 | Renault | ................... B60B 35/16 |
| | | | | 180/905 |

(Continued)

FOREIGN PATENT DOCUMENTS

| | | | |
|---|---|---|---|
| CN | 201736742 U | * | 2/2011 |
| CN | 202623801 U | * | 12/2012 |

(Continued)

*Primary Examiner* — Sherry L Estremsky
(74) *Attorney, Agent, or Firm* — McCoy Russell LLP

(57) ABSTRACT

Described herein is a trumpet arm for use in an electric drive axle. In one embodiment, the trumpet arm comprises a housing with an arm section extending an arm length, the arm section having an outlet at a first end, and a flange with a planar face at a second end opposite the first end. The trumpet arm further comprises internal buttresses positioned in an interior of the housing and extending through at least a first portion of a flange length of the flange, a flange/arm transition at which the flange transitions into the arm section, and at least a portion of the arm length.

18 Claims, 21 Drawing Sheets

(51) Int. Cl.
*F16H 48/30* (2012.01)
*F16H 57/021* (2012.01)
*F16H 57/037* (2012.01)
F16H 57/02 (2012.01)

(56) References Cited

U.S. PATENT DOCUMENTS

| | | | | |
|---|---|---|---|---|
| 1,440,341 | A * | 12/1922 | Crispen | F16H 48/295 |
| | | | | 192/18 R |
| 2,904,145 | A * | 9/1959 | Sheppard | B60K 17/043 |
| | | | | 180/370 |
| 7,465,246 | B2 * | 12/2008 | Okamuro | B60K 17/16 |
| | | | | 475/230 |
| 10,179,478 | B2 * | 1/2019 | Bauer | B60B 35/166 |
| 10,882,389 | B2 * | 1/2021 | Kucharski | B60K 17/04 |
| 11,247,548 | B2 * | 2/2022 | Devreese | B60K 17/346 |
| 11,247,556 | B2 * | 2/2022 | Kucharski | B60B 35/122 |
| 11,750,063 | B2 * | 9/2023 | Umerley | F16H 57/0423 |
| | | | | 180/65.1 |
| 2015/0290973 | A1 * | 10/2015 | Stamets | B21D 53/90 |
| | | | | 29/428 |

FOREIGN PATENT DOCUMENTS

| | | | | |
|---|---|---|---|---|
| CN | 202641257 U | * | 1/2013 | |
| CN | 103029516 A | * | 4/2013 | |
| CN | 203528205 U | * | 4/2014 | |
| CN | 109334419 A | * | 2/2019 | ............... B60K 1/00 |
| CN | 112265416 A | * | 1/2021 | ........... B60B 35/163 |
| CN | 114905943 A | * | 8/2022 | |
| CN | 221213326 U | * | 6/2024 | |
| FR | 2628039 A1 | * | 9/1998 | |

* cited by examiner

TRUMPET ARM WITH INTERNAL BUTTRESSES

CROSS-REFERENCE TO RELATED APPLICATIONS

The present application claims priority to U.S. Provisional Application No. 63/582,182, entitled "TRUMPET ARM WITH INTERNAL BUTTRESSES", and filed on Sep. 12, 2023. The entire contents of the above-listed application are hereby incorporated by reference for all purposes.

TECHNICAL FIELD

The present description relates generally to a trumpet arm for an axle of an electric vehicle (EV).

BACKGROUND AND SUMMARY

Axle assemblies are adapted to transmit rotational power from a rotational power source of a vehicle to the wheels thereof. Typically, an axle assembly includes a differential assembly that is rotatably supported within a non-rotating housing (e.g., carrier). The differential is connected between an input drive shaft extending from the rotational power source/transmission and a pair of output axle shafts extending to the vehicle wheels. The axle shafts are contained in respective non-rotating beam housing portions, which are secured to a central housing. Thus, rotation of the differential by the drive shaft causes corresponding rotation of the axle shafts. The central housing and the beam housing portions form an axle housing for these drive train components of the axle assembly, with the differential and the axle shafts supported for rotation therein.

One type of axle housing includes a unitized central housing construction, commonly referred to as a Salisbury axle assembly. In this structure, the central housing (which houses the differential assembly) is directly connected to the two beam tube portions (which house the rotatable axle shafts). Another type of axle housing includes a central housing construction which is continuous with two arm portions, where each of the arm portions form a smooth, gradual, flared connection with the central housing. This central portion is generally hollow and cylindrical in shape, having a large generally circular opening formed therethrough. The overall shape of this type of axle housing generally resembles the shape of a banjo musical instrument. Hence, this type of axle housing is commonly referred to as a banjo type axle housing.

As electric vehicles move towards the use of electric axles, traditional banjo and Salisbury axles with their streamlined housings may not provide enough room to package all of the components needed for an electric axle, such as one or more motors, gears, shafts, bearings, shift actuators, differentials, pumps, heat exchangers, filters, sensors, and so on. For example, the long, gradual transition from the arm section to the bowl of a banjo axle may distribute a road load in a y-z plane (e.g., perpendicular to a drive surface) and reduce stresses on the banjo axle. Some banjo axles may include a stiffening ring within the bowl to further stiffen the bowl in the y-z plane. However, the shape of the bowl, both with and without the stiffening ring, may provide a space which is smaller than is desired for packaging electric axle components therein. The geometry of a Salisbury axle may similarly restrict a space for packaging electric axle components to a curved space which is smaller than is desired for the electric axle components. Thus, there is demand for an axle which provides a desirable amount and shape of space in which to package electric axle components. A rectangular packaging envelope may be desired to package electric axle components, for example, however the rectangular shape may impinge on structural reinforcements (e.g., the stiffening ring, the long, gradual transition) of the banjo axle and/or the Salisbury axle.

A potential solution is an axle with a gearbox housing having relatively flat sides and two trumpet arms extending along an output axle axis. This may help achieve a packaging space demanded to fit electric axle components. However, challenges arise where an arm of a trumpet arm meets a flange of the trumpet arm (e.g., a flange/arm transition), where the flange is used to bolt the trumpet arm to the gearbox housing. The flange/arm transition is a high-stress region. However, decreasing a length of the arm is undesirable, as the full arm length may be used to enable integration of multiple different suspension mounting packages. Maintaining a desired length of the arm while providing a desirable packaging space may prevent the trumpet arm from having a gradual transition, a long chamfer, or external gussets to assist in stiffening and strengthening the flange/arm transition.

Described herein is an axle housing configured as a trumpet arm having internal buttresses as a means to help stiffen and strengthen the flange/arm transition while still maintaining a desired length of the arm section. For example, a trumpet arm comprises a housing with an arm section extending an arm length, the arm section having an outlet at a first end, and a flange with a planar face at a second end opposite the first end. The trumpet arm further comprises internal buttresses positioned in an interior of the housing and extending through at least a first portion of a flange length of the flange, a flange/arm transition at which the flange transitions into the arm section, and at least a portion of the arm length. In some embodiments, the trumpet arm further comprises external buttresses (gusset, trusses), where external buttresses extend at least a second portion of the flange length and where endpoints of the internal buttresses and external buttresses are offset from each other. The flange may include a curved extension or an angled extension from the planar face to the flange/arm transition. In this way, the flange/arm transition may be desirably resistant to degradation due to deflection of the arm during use of the trumpet arm in a vehicle axle. Further, the planar face of the flange provides a rectangular envelope in which components of an electric axle may be positioned, which may enable use of the trumpet arm in an e-axle for an electric vehicle (e.g., electric vehicle, hybrid electric vehicle, and/or plug-in electric vehicle).

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
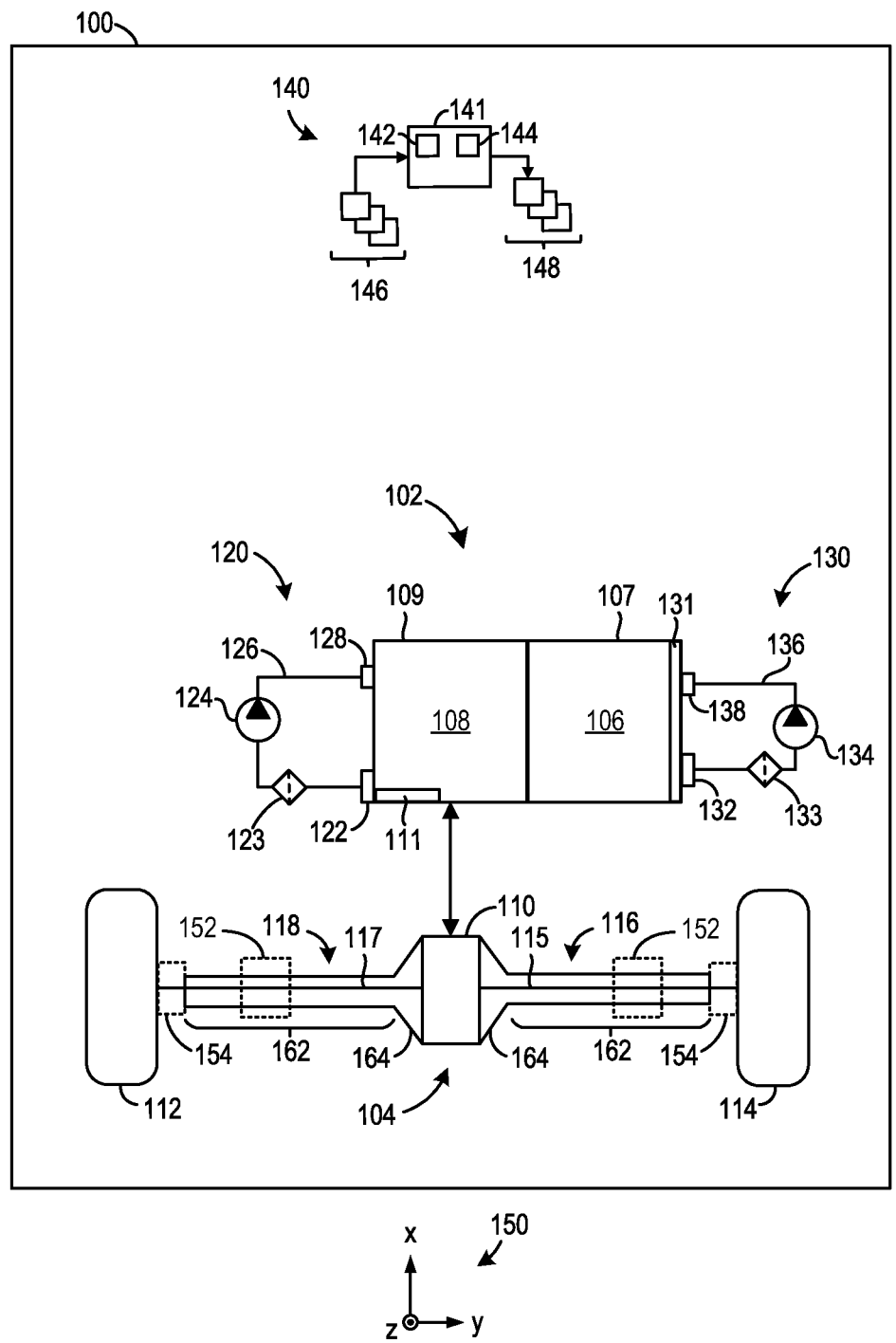
FIG. 1 shows a schematic representation of an electric drive system with trumpet arms.

The following description relates to systems for an electric axle and, specifically, a trumpet arm comprising a housing with an arm section extending an arm length, the arm section having an outlet at a first end, and a flange with a planar face at a second end opposite the first end. The trumpet arm further comprises internal buttresses positioned in an interior of the housing and extending through at least a first portion of a flange length of the flange, a flange/arm transition at which the flange transitions into the arm section, and at least a portion of the arm length. The internal buttresses provide strength and rigidity to the trumpet arm. The flange with the planar face enables formation of a rectangular space between two trumpet arms configured as described herein, where electric axle components may be positioned in the rectangular space. Further, the arm section length is configured to enable mounting of different sized and shaped suspension packages thereon. The configuration of the trumpet arm enables electric axle components to be included in the electric drive axle (e.g., e-axle) while achieving a desired rigidity and strength of the trumpet arm.

The trumpet arm may have different embodiments, as further described herein, which are configured to provide a desirable amount of space, rigidity, and resistance to degradation with respect to a system in which the trumpet arm is included. For example, a body of the flange may be angled and include external buttresses (gussets, trusses) in some embodiments, while in other embodiments, the body of the flange may be curved, where a convex or concave side of the body of the flange is coupled to the arm. The internal buttresses may have a variety of configurations comprised of two or more legs (e.g., "x" configuration, "y" configuration, and so on), where different configurations may be used in different vehicle applications. Additionally, a cross section (e.g., rectangular, circular, and so on) of the arm section may be different for different vehicle applications. Embodiments of the trumpet arm described herein may be used in an e-axle, where a first trumpet arm and a second trumpet arm are coupled to an electric machine via the flange of each trumpet arm. Further, a sizing of the arm section (e.g., the arm length, the cross section of the arm section) may enable mounting of different suspension packages on the trumpet arm. The e-axle may also include a differential lock/axle disconnect assembly in one or more of the trumpet arms which is coupled to a differential and used to control rotational power outlet from the electric machine to wheels of the e-axle. As further described herein, inclusion of reinforcing buttresses (e.g., internal buttresses and external buttresses) may provide rigidity at pivot points (e.g., stress points) of the trumpet arm. In this way, the trumpet arm described herein provides a geometry which enables mounting of electric machine components and suspension packages on an e-axle, while also providing a strength and rigidity which may protect against degradation of the trumpet arm due to deflective force stresses.

Figure 2:
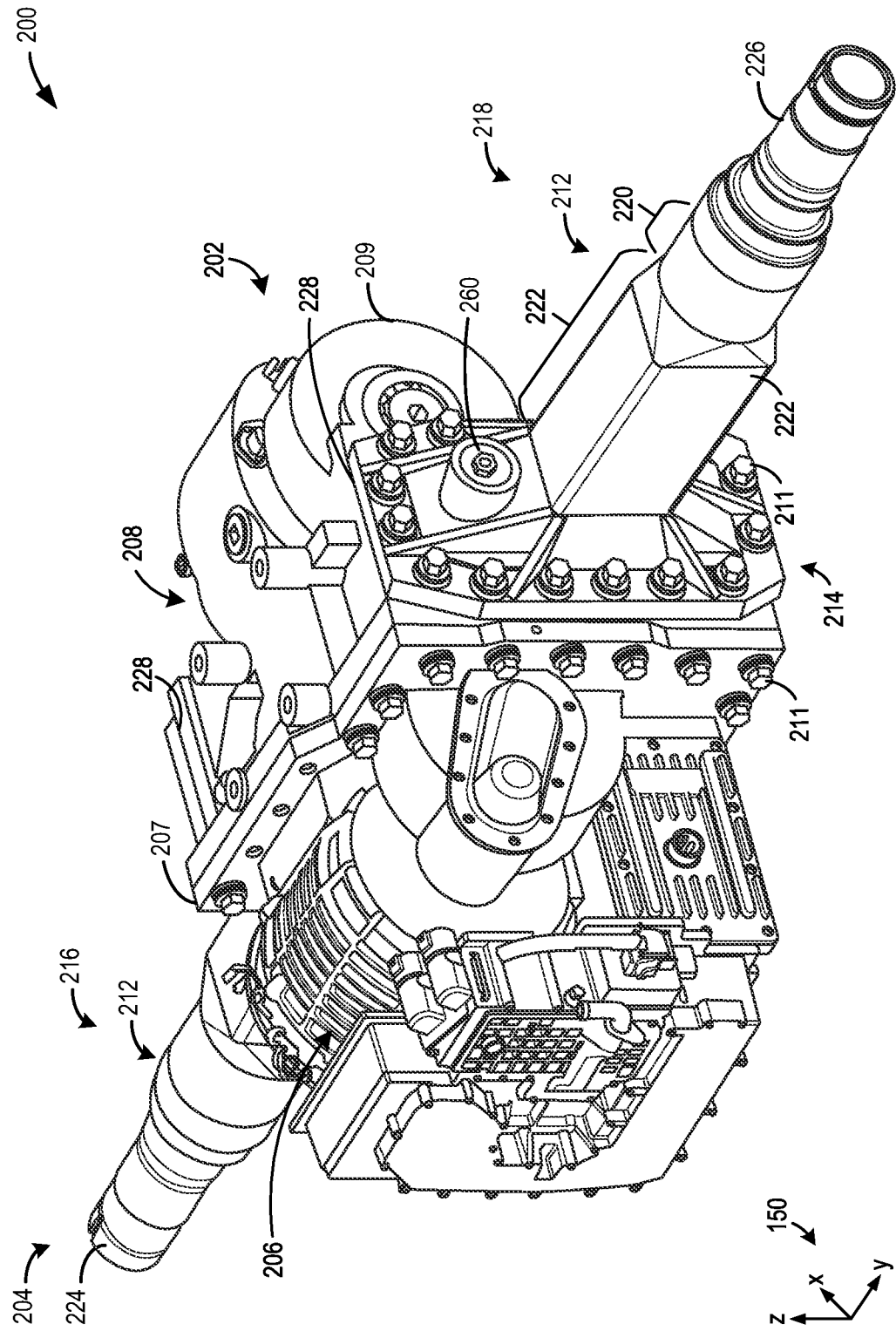
FIG. 2 shows a perspective view of an electric drive system, according to one example, which includes two trumpet arms.
Figure 3:
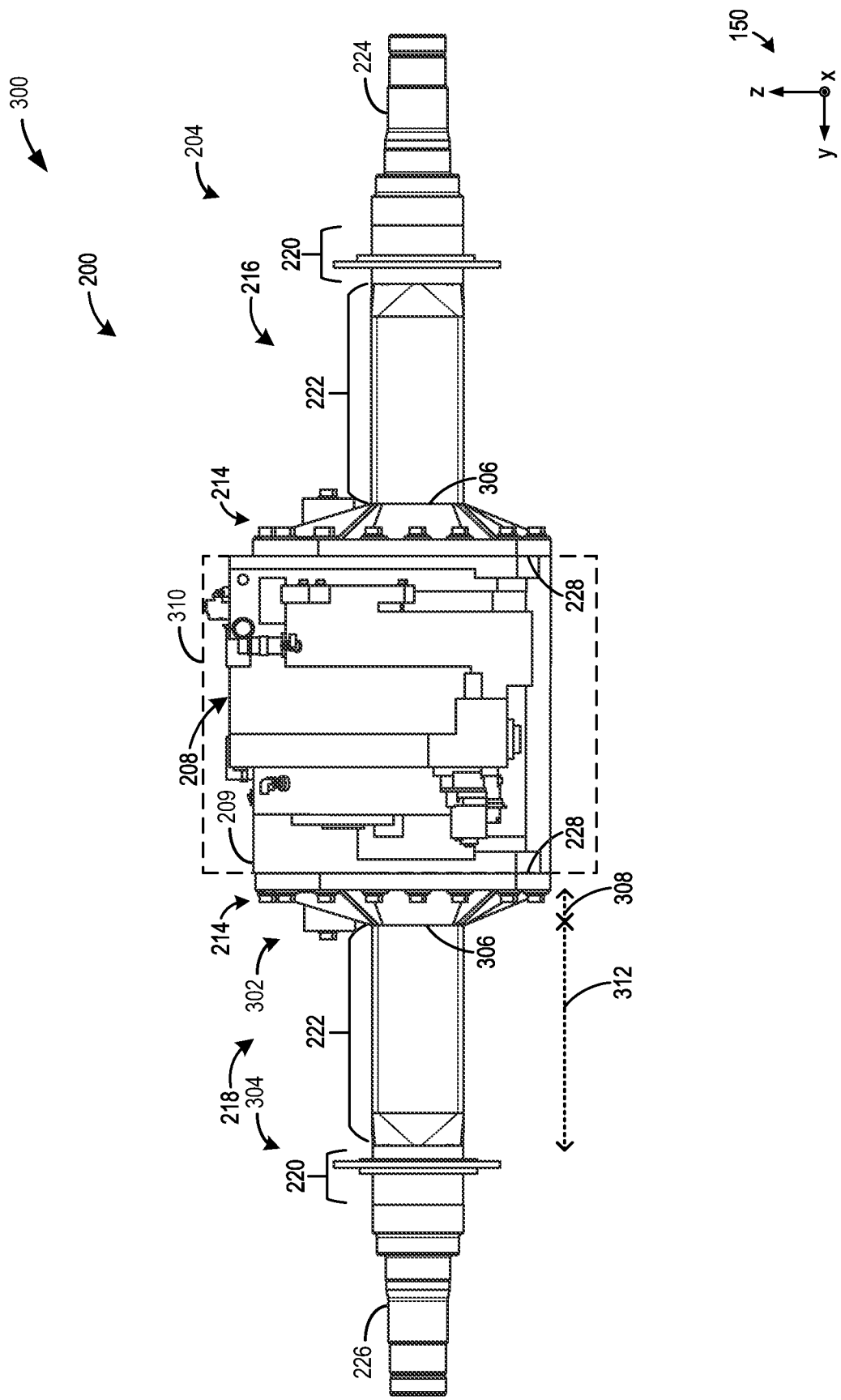
FIG. 3 shows a profile view of the electric drive system, according to one example.
Figure 11:
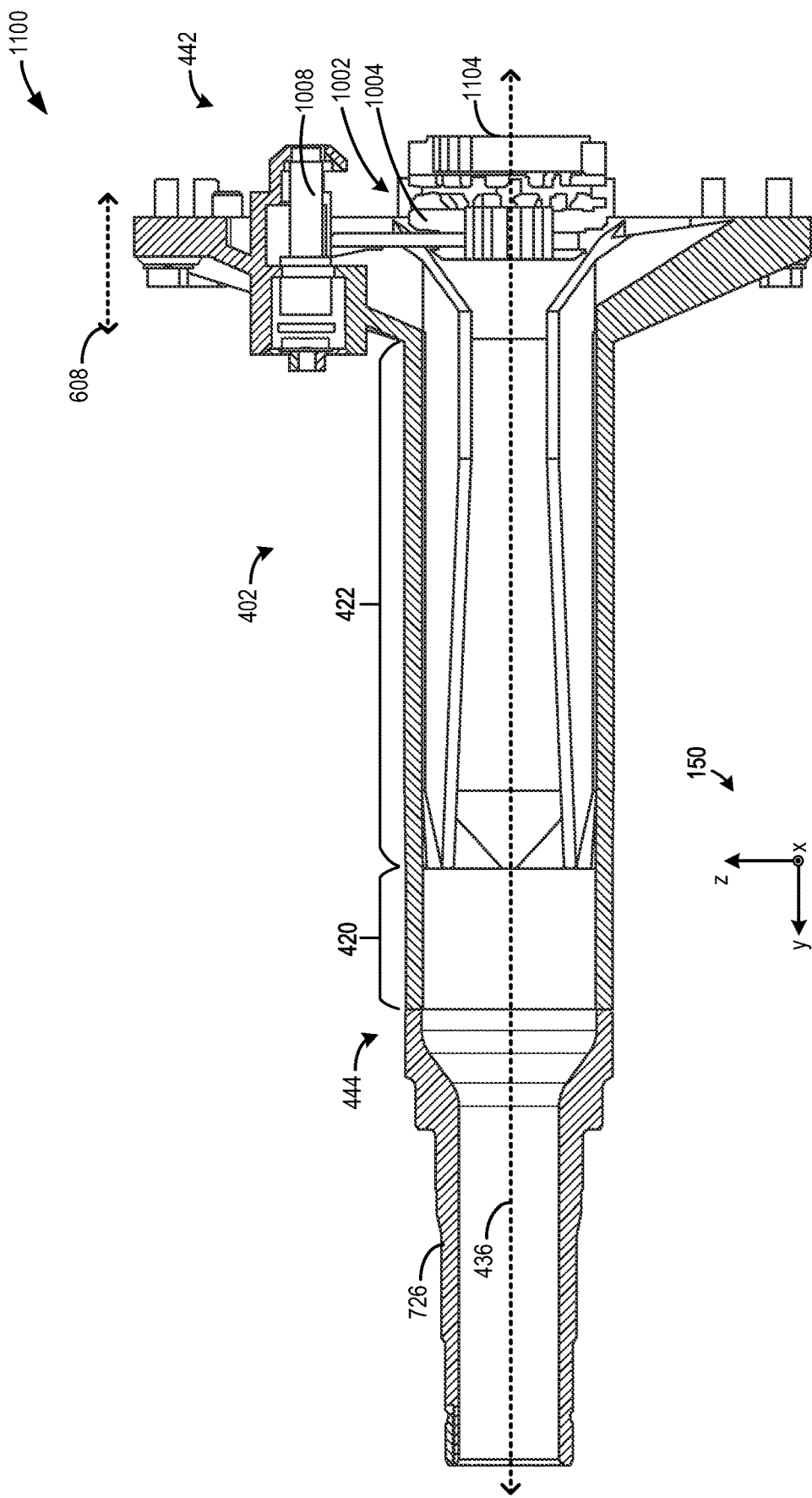
FIG. 11 shows a cross section view of the trumpet arm with the spindle and the differential lock/axle disconnect assembly of FIG. 10.
Figure 12:
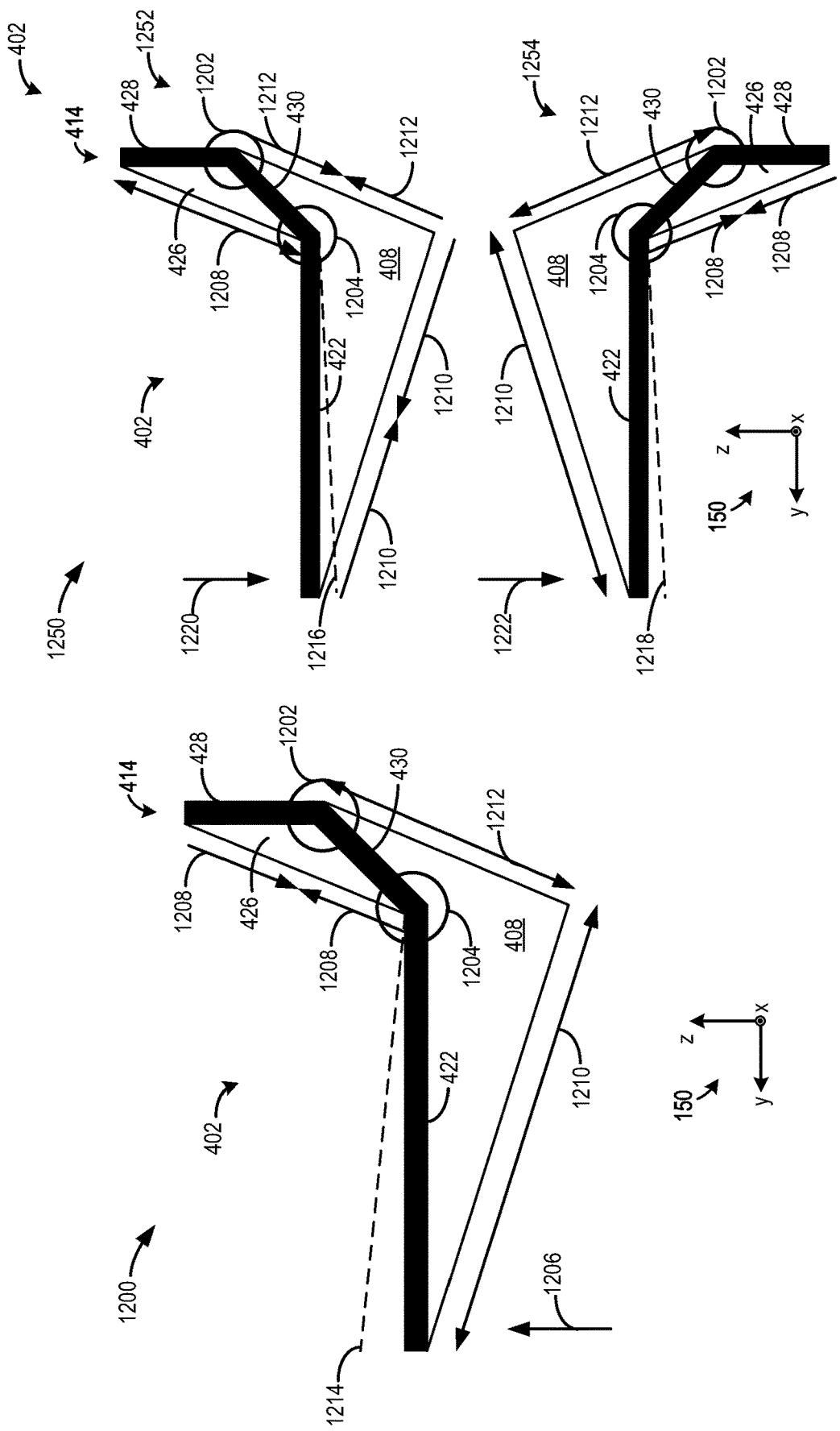
FIG. 12 shows schematic representations of load distribution by internal buttresses of a trumpet arm.
Figure 13:
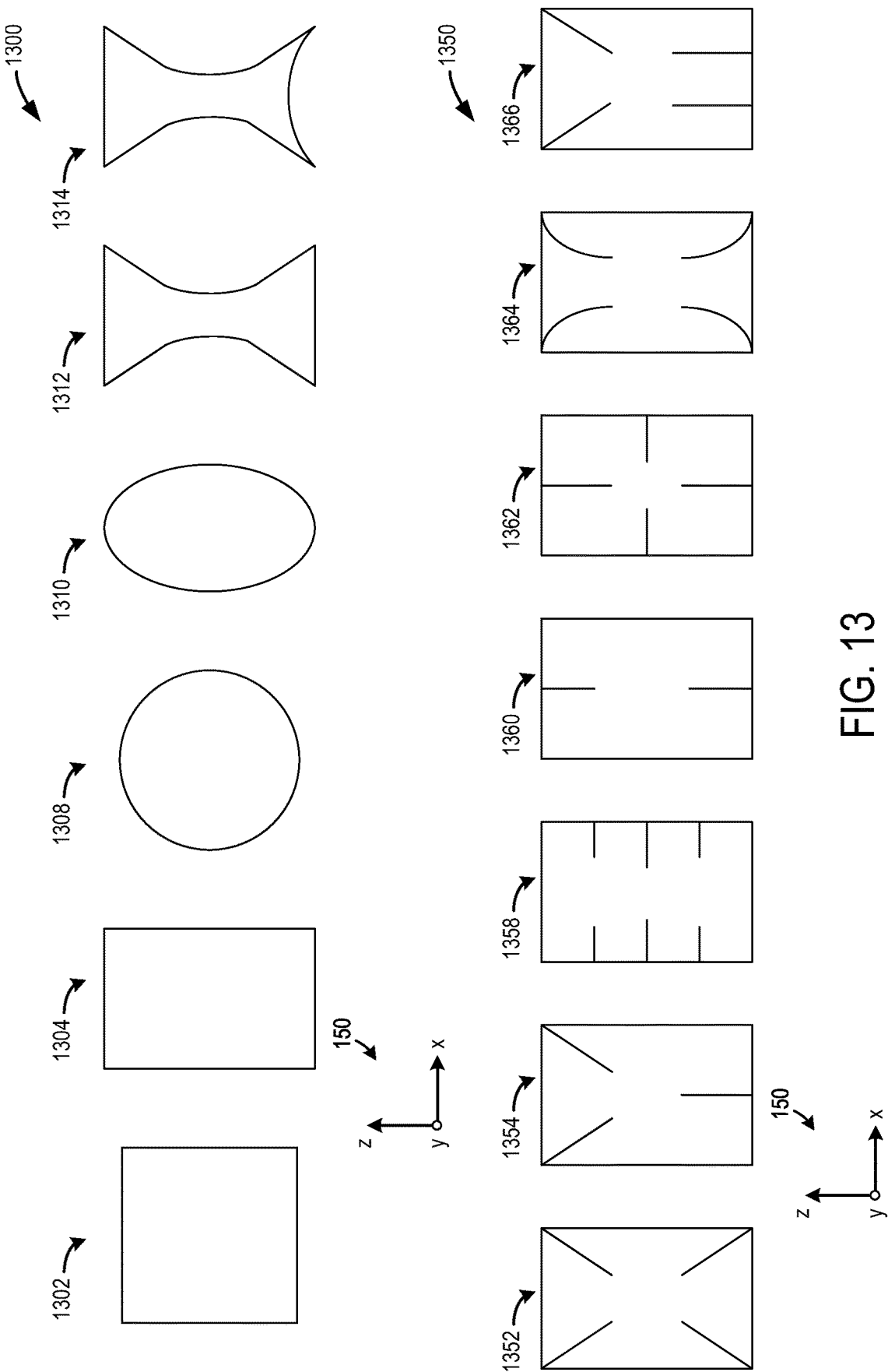
FIG. 13 shows example orientations of internal buttresses and cross sections of an arm section of a trumpet arm.
Figure 17:
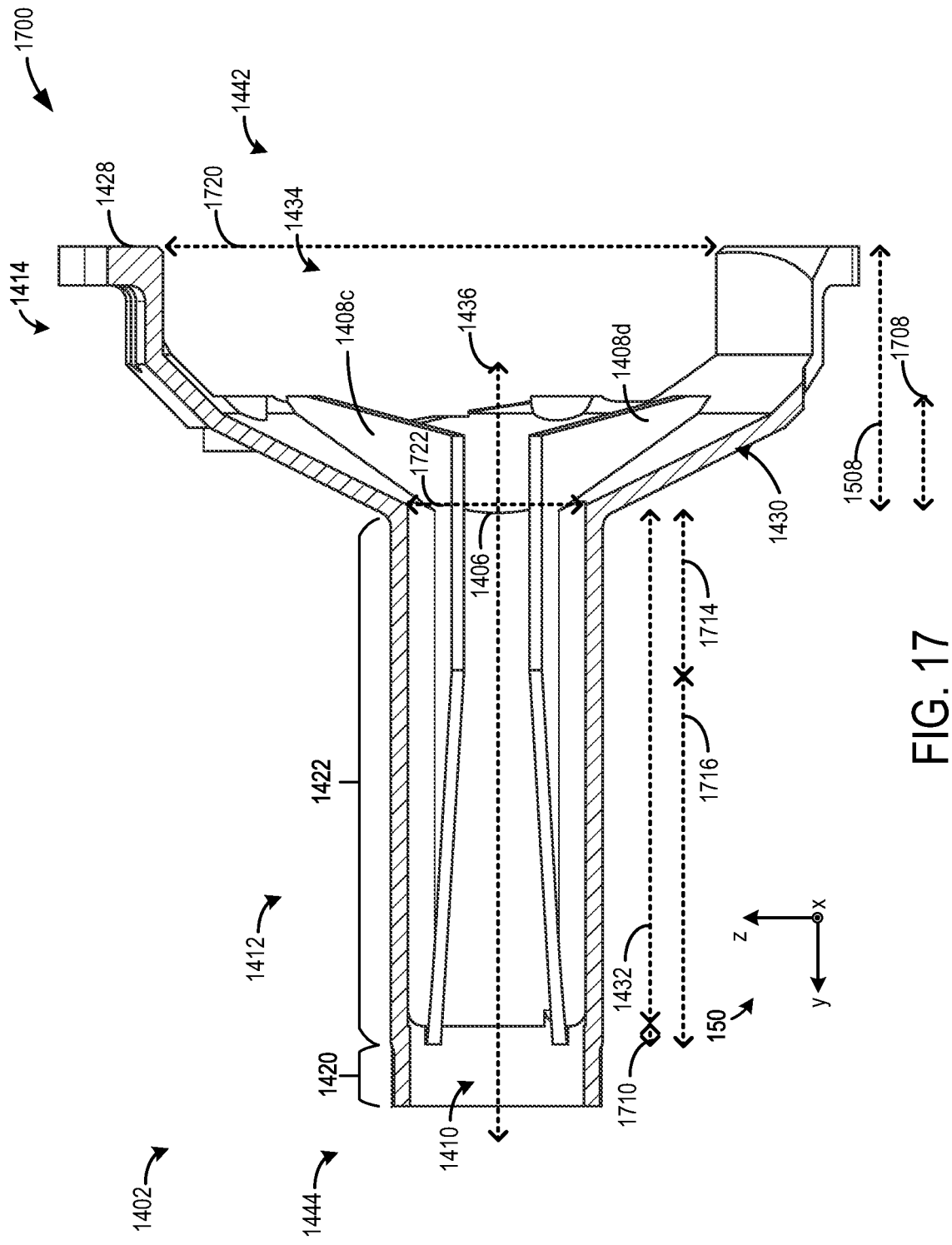
FIG. 17 shows a cross section view of the trumpet arm with the curved flange.
Figure 18:
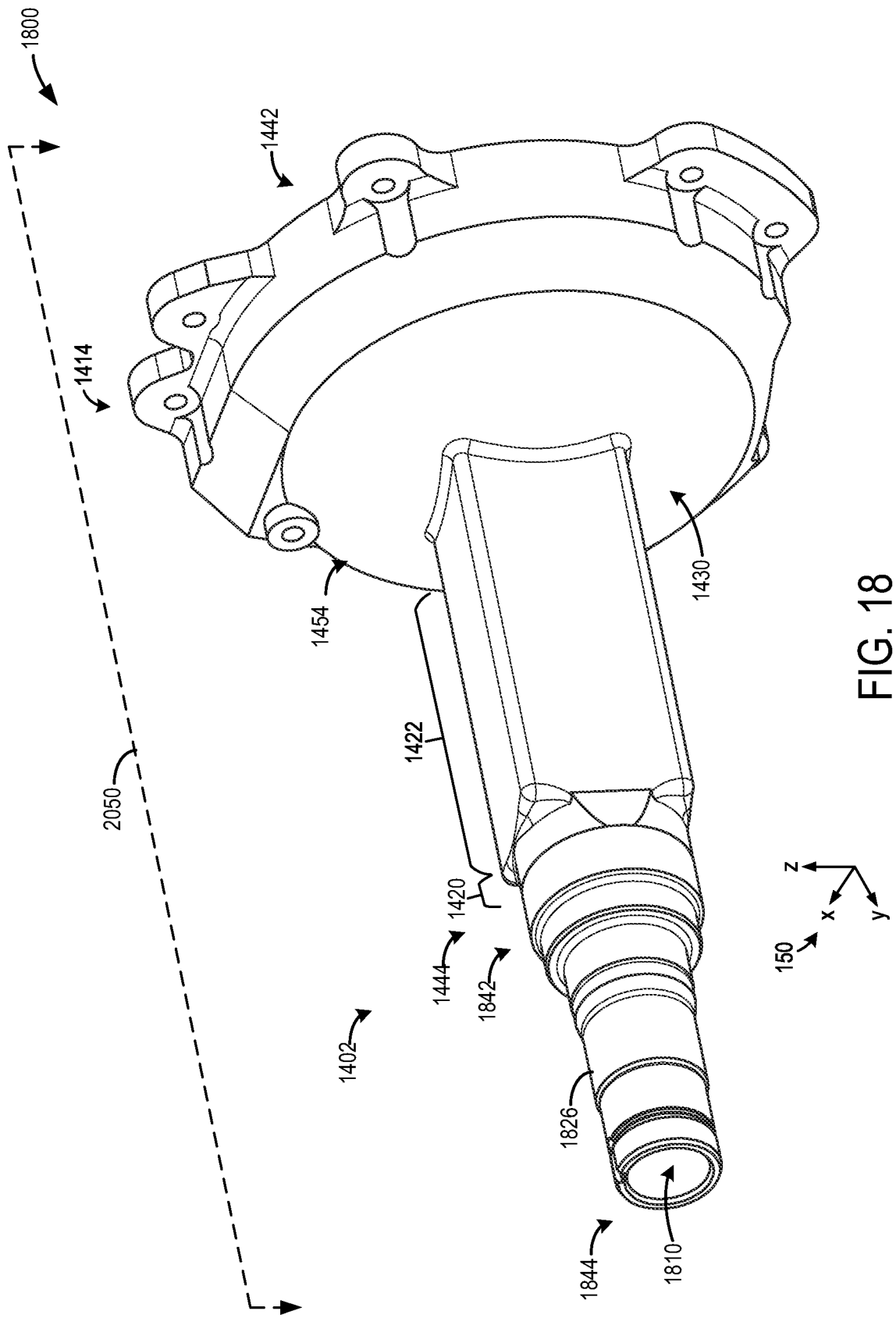
FIG. 18 shows a perspective view of a trumpet arm with a curved flange and a spindle.
Figure 19:
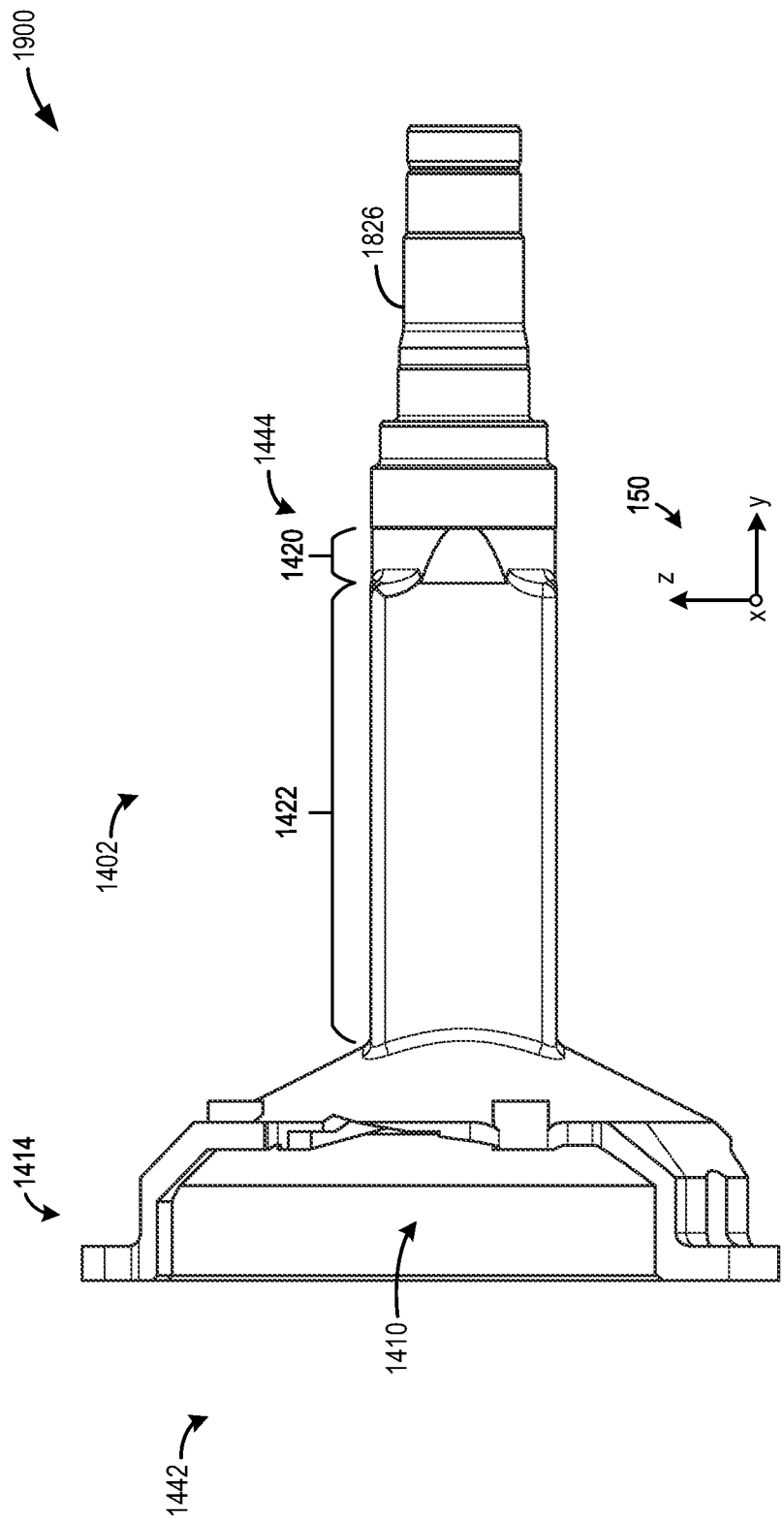
FIG. 19 shows a profile view of the trumpet arm with the curved flange and the spindle of FIG. 18.
Figure 20:
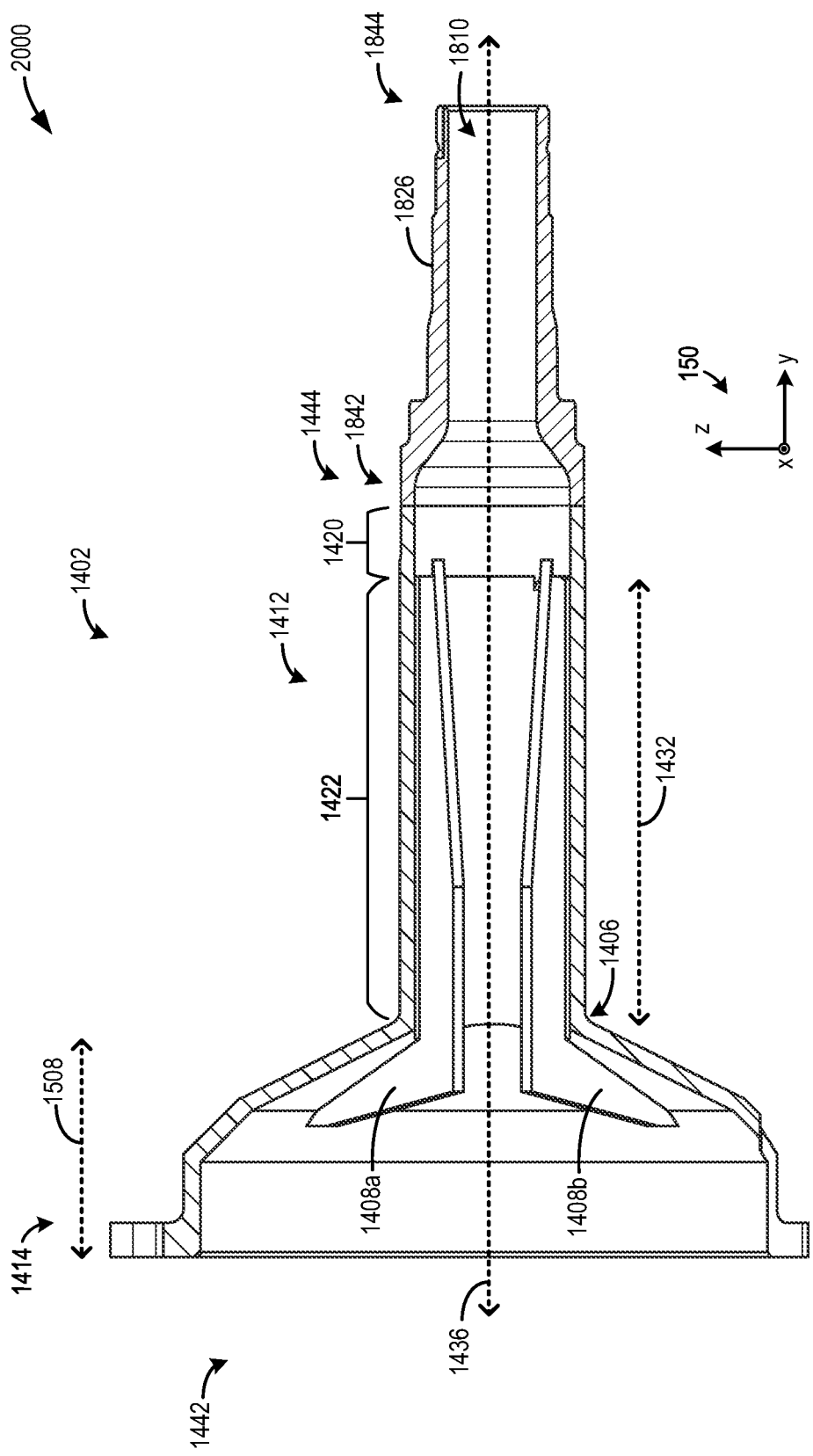
FIG. 20 shows a cross section view of the trumpet arm with the curved flange and the spindle.

FIG. 1 schematically depicts an electric drive system in a vehicle with at least one trumpet arm used for an e-axle of the electric drive system, where the trumpet arm is configured as described herein and acts as a non-rotating beam housing portion in which rotatable axle shafts are contained. FIGS. 2 and 3 show views of an electric drive system (e.g., of FIG. 1) wherein a first trumpet arm and a second trumpet arm are positioned to form a rectangular space in which a main gearbox housing may be positioned and coupled to each of the first trumpet arm and the second trumpet arm. FIGS. 4-11 show different profile, perspective, and cross section views of a trumpet arm which may be included in the systems of FIGS. 1-3, including embodiments of the trumpet arm which include additional components, such as a spindle and a differential lock/axle disconnect assembly. FIG. 12 shows schematic representations of load reactions by internal buttresses of a trumpet arm (e.g., of FIGS. 4-11). FIG. 13 shows illustrations of different embodiments of cross sections of the arm section and different orientations of internal buttresses of the trumpet arm. FIGS. 14A-20 show different profile, perspective, and cross section views of a second embodiment of a trumpet arm where the flange of the trumpet arm has a curved geometry. The second embodiment of the trumpet arm of FIGS. 14A-20 may be included in the systems of FIGS. 1-3. FIGS. 14A-16 show perspective and profile views, and FIG. 17 shows a cross section view of the second embodiment of the trumpet arm. FIGS. 18-20 show perspective views and a cross sectional view of the second embodiment of the trumpet arm with a spindle. FIGS. 2-11 and 14A-20 are drawn approximately to scale. However, other relative component dimensions may be used, in other embodiments.

FIG. 1 schematically illustrates an electric vehicle 100 with an electric drive system 102 that provides power to and/or is incorporated into an axle assembly 104 of vehicle 100. The vehicle 100 may take a variety of forms in different examples, such as a light, medium, or heavy duty vehicle. Additionally, the electric drive system 102 may be adapted for use in front and/or rear axles, as well as steerable and non-steerable axles. To generate power, the electric drive system 102 may include an electric machine 106. In some examples, the electric machine 106 may be an electric motor-generator and may thus include conventional components such as a rotor, a stator, and the like housed within an electric machine housing 107 for generating mechanical power as well as electric power during a regenerative mode, in some cases. Further, in other examples, the vehicle 100 may include an additional motive power source, such as an internal combustion engine (ICE) (e.g., a spark and/or compression ignition engine), for providing power to another axle. As such, the electric drive system 102 may be utilized in an electric vehicle (EV), such as a hybrid electric vehicle (HEV) or a battery electric vehicle (BEV).

In some examples, the electric machine housing 107 may be coupled (e.g., via bolts) to a gearbox housing 109 of a gearbox 108. Further, the electric machine 106 may provide mechanical power to a differential 110 via the gearbox 108. From the differential 110, mechanical power may be transferred to drive wheels 112, 114 (e.g., a first wheel 112, a second wheel 114) by way of axle shafts 117, 115, respectively, of the axle assembly 104. As such, the differential 110 may distribute torque, received from the electric machine 106 via the gearbox 108, to the drive wheels 112, 114 of the axle shafts 117, 115, respectively, during certain operating conditions. In some examples, the differential 110 may be a locking differential, an active or passive limited slip differential, or a torque vectoring differential.

One or both of the axle shafts 117, 115 may be housed in a trumpet arm, as further described herein. For example, axle shaft 117 is housed in a first trumpet arm 118, and axle shaft 115 is housed in a second trumpet arm 116. Each of the first trumpet arm 118 and the second trumpet arm 116 have the same configuration for a trumpet arm, which comprises: a housing with an arm section 162 extending an arm length, the arm section having an outlet at a first end, and a flange 164 with a planar face at a second end opposite the first end; and internal buttresses positioned in an interior of the housing and extending through at least a first portion of a flange length of the flange, a flange/arm transition at which the flange transitions into the arm section, and at least a portion of the arm length. Each of the first trumpet arm 118 and the second trumpet arm 116 may be coupled to the differential 110 at a respective planar face of the flange.

In some embodiments, axle assembly 104 includes additional elements which are coupled to, mounted on, or otherwise joined with at least one of the first trumpet arm 118 and the second trumpet arm 116. For example, a suspension package 152 may be mounted on both of the first trumpet arm 118 and the second trumpet arm 116 along the respective arm section 162. In some embodiments, a spindle 154 may be coupled to the outlet of each of the first trumpet arm 118 and the second trumpet arm 116. For example, a first spindle end of the spindle 154 may be coupled to the respective trumpet arm, and drive wheels (e.g., the first wheel 112 or the second wheel 114) may be coupled to each of the first spindle and the second spindle at a second spindle end of the respective spindle, opposite the first spindle end of the spindle.

As further described herein, one or more of the first trumpet arm 118 and the second trumpet arm 116 may also include a differential lock/axle disconnect assembly positioned in a body of the flange 164. The differential lock/axle disconnect assembly may be configured to selectively mate with a mating clutch of the differential 110 and/or the gearbox 108, respectively.

The gearbox 108 may be a single-speed gearbox, where the gearbox 108 operates in one gear ratio. However, other gearbox arrangements have been envisioned such as a multi-speed gearbox that is designed to operate in multiple distinct gear ratios. Further, in one example, the electric machine 106, the gearbox 108, and the differential 110 may be incorporated into the axle 104, forming an electric axle (e-axle) in the vehicle 100. The e-axle, among other functions, provides motive power to the wheels 112, 114 during operation. Specifically, in the e-axle embodiment, the electric machine 106 and gearbox 108 may be coupled to and/or otherwise supported by the first trumpet arm 118 and the second trumpet arm 116. The e-axle may provide a compact arrangement for delivering power directly to the axle 104. For example, the first trumpet arm 118 may be coupled to a first side of the gearbox housing 109 and the second trumpet arm 116 may be coupled to a second side of the electric machine housing 107, opposite the first side, as further described with respect to FIGS. 2-3.

The electric drive system 102 may further include an oil circuit 120 for circulating oil (e.g., natural and/or synthetic oil) through the gearbox housing 109 to lubricate and/or cool various system components. The oil circuit 120 may include a filter 123 and an oil pump 124 that draws oil from an oil reservoir 111 (e.g., a sump) in the gearbox housing 109, via an outlet 122, and drives a pressurized oil flow through a delivery line 126 to an inlet 128 of the gearbox housing 109. In some examples, the oil pump 124 may be provided at an exterior portion of the gearbox housing 109. However, in other examples, the oil pump may be included within the gearbox housing 109. Various distribution components and arrangements (e.g., nozzles, valves, jets, oil passages, and the like) of the oil circuit 120 may be included within the electric drive system 102 in order to facilitate routing of the oil within the gearbox housing 109 and, in one particular example, to a portion of the electric machine housing 107. In some case, the oil circuit 120 may be used for routing oil to various gearbox bearings and gears as well as the motor stator, motor rotor, and rotor shaft bearings of the electric machine 106, thereby providing an efficient system for effectively using the gearbox oil to cool said systems. In some embodiments, the oil circuit 120 may further include a heat exchanger (e.g., radiator) which removes heat from the oil that exits the gearbox housing 109 by way of the outlet 122.

The electric drive system 102 may further include a coolant circuit 130 that circulates coolant (e.g., water, glycol, and/or oil) through coolant passages 131 formed in the electric machine 106 or electric machine housing 107. The coolant circuit 130 may include a coolant inlet 138 and a coolant outlet 132 positioned on (or in) the electric machine housing 107. The coolant circuit 130 may further include a filter 133 and a pump 134 that circulates coolant from the coolant outlet 132 to the coolant inlet 138 via a coolant delivery line 136. From the coolant inlet 138, the coolant travels into the coolant passages 131 formed in the electric machine 106 or the electric machine housing 107 which removes heat from components of the electric machine 106. In some examples, the coolant circuit 130 may further include a heat exchanger (e.g., radiator) which removes heat from the coolant that exits the electric machine housing 107 by way of the coolant outlet 132.

The vehicle 100 may also include a control system 140 with a controller 141. The controller 141 may include a processor 142 and a memory 144. The memory may hold instructions stored therein that when executed by the processor cause the controller 141 to perform various methods, control techniques, and the like described herein. The processor 142 may include a microprocessor unit and/or other types of circuits. The memory 144 may include known data storage mediums such as random access memory, read only memory, keep alive memory, combinations thereof, and the like. The controller 141 may receive various signals from sensors 146 positioned in different locations in the vehicle 100 and electric drive system 102. The controller 141 may also send control signals to various actuators 148 coupled at different locations in the vehicle 100 and electric drive system 102. For instance, the controller 141 may send command signals to the oil pump 124 and/or the pump 134 and, in response, the actuator(s) in the pump(s) may be adjusted to alter the flowrate of the oil and/or coolant delivered therefrom. In other examples, the controller may send control signals to the electric machine 106, and in response to receiving the command signals, the electric machine may be adjusted to alter a rotor speed or torque. The other controllable components in the system may be operated in a similar manner with regard to sensor signals and actuator adjustment.

An axis system 150 is provided in FIG. 1, as well as FIGS. 2-20, for reference. The z-axis may be a vertical axis (e.g., parallel to a gravitational axis), the x-axis may be a longitudinal axis (e.g., horizontal axis), and/or the y-axis may be a lateral axis, in one example. However, the axes may have other orientations, in other examples.

FIG. 2 depicts an example electric drive system 200 with electric axle components 202 for providing power to an axle assembly 204. The electric axle components 202 of the electric drive system 200 may include an electric machine 206 operatively coupled to a gearbox 208, and may be included in a vehicle, such as the vehicle 100 depicted in FIG. 1. The electric drive system 200 may thus share similarities with the electric drive system 102. For instance, at least a portion of the components discussed with regard to the drive system 102, shown in FIG. 1, may be included in the electric drive system 200, shown in FIG. 2, or vice versa.

The axle assembly 204 includes a first trumpet arm 216 and a second trumpet arm 218, both of which are examples of a trumpet arm comprising a housing 212 with an arm section 222 extending an arm length, the arm section 222 having an outlet at a first end, and a flange 214 with a planar face 228 at a second end opposite the first end, and further including internal buttresses (not shown in FIG. 2) positioned in an interior of the housing 212 and extending through at least a first portion of a flange length of the flange 214, a flange/arm transition at which the flange transitions into the arm section 222, and at least a portion of the arm length. The planar face of the flange 214 enables positioning of electric axle components 202, such as the electric machine 206, the gearbox 208, and/or a differential (not shown in FIG. 2) in the axle assembly 204 while achieving a desired strength and rigidity of the axle assembly 204 which distributes a road load and reduce stresses on the trumpet arms, as further described herein.

The electric machine 206 may include an electric machine housing 207, which is coupled to a gearbox housing 209 of the gearbox 208. In some cases, the electric machine housing 207 may be coupled to the gearbox housing 209 via any suitable attachment mechanism (e.g., bolts, brackets, welds, and/or combinations thereof), such as bolts 211. As further described herein, the flange 214 of each of the first trumpet arm 216 and the second trumpet arm 218 includes multiple through holes around a perimeter of the flange 214 at the planar face. Bolts 211 may extend through each of the multiple through holes and couple the first trumpet arm 216 and the second trumpet arm 218 to the gearbox housing 208. In other embodiments, the first trumpet arm 216 and the second trumpet arm 218 may be additionally or alternatively coupled to the electric machine housing 207. Each of the first trumpet arm 216, the second trumpet arm 218, the electric machine housing 207, and the gearbox housing 209 may be made of a metal (e.g., aluminum, steel, iron, combinations thereof, and the like) which may be the same or a different metal for each housing.

The electric machine 206 may provide power to a differential (not shown) via the gearbox 208 to provide rotational power to a first axle shaft and a second axle shaft (to which drive wheels may be coupled) of the axle assembly 204. The first axle shaft and the second axle shaft are not shown in FIG. 2, and are to be understood as being at least partially enclosed within the housing 212 of the first trumpet arm 216 and the second trumpet arm 218, respectively. In some embodiments, each of the first trumpet arm 216 and the second trumpet arm 218 have a spindle coupled to the housing 212 at the outlet of the arm section 222. For example, a first spindle 224 is coupled to the first trumpet arm 216 and a second spindle 226 is coupled to the second trumpet arm 218 at an outlet 220 of each trumpet arm, as further described with respect to FIG. 3. A drive wheel may be mounted on each of the first spindle 224 and the second spindle 226, and the first axle shaft and the second axle shaft may extend through each of the first spindle 224 and the second spindle 226, respectively, to drive rotation of the respective drive wheel.

In the embodiment of a trumpet arm shown in FIG. 2, either or both of the first trumpet arm 216 and the second trumpet arm 218 may be configured with a differential lock/axle disconnect assembly 260, which may be at least partially enclosed within the respective housing 212. As further described herein with respect to FIGS. 7 and 10, the differential lock/axle disconnect assembly 260 may selectively mate with a mating clutch of the differential to selectively couple the axle shaft extending through the respective trumpet arm to the differential, or in other instances selectively mate with a mating clutch of the gearbox 208 to selectively decouple the axle shaft extending through the respective trumpet arm from the power path.

FIG. 3 shows a profile view 300 of the electric drive system 200, including the first trumpet arm 216, the second trumpet arm 218, and electric axle components 202. As described with respect to FIG. 2, each of the first trumpet arm 216 and the second trumpet arm 218 have the same configuration and include the flange 214 with the planar face 228 at a first end 302 of the housing 212 and the outlet 220 at a second end 304, opposite the first end 302. The arm section 222 extends between the flange 214 and the outlet 220, and intersects with the flange 214 at a flange/arm transition 306. In the embodiment of the electric drive system 200 shown in FIGS. 2 and 3, and as further described with respect to FIGS. 4-12 the flange 214 includes an angled extension from the planar face 228 to the flange/arm transition 306. In other embodiments, such as described with respect to FIGS. 14A-20, the flange 214 may include a curved extension from the planar face 228 to the flange/arm transition 306.

The flange/arm transition 306 is a high stress region due to the abrupt junction between the flange 214 and the arm section 222, compared to a gradual transition between a flange and an arm section in axles such as the banjo axle and the Salisbury axle. For example, as a vehicle (e.g., the vehicle 100 of FIG. 1) including the electric drive system 200 with drive wheels coupled to each of the first spindle 224 and the second spindle 226 of the axle assembly 204 travels down a road, the drive wheels may drive over bumps and/or holes in the road which cause the vehicle and thus the trumpet arms to move up and down along the z-axis, with reference to the axis system 150. This may create stress at the flange/arm transition 306, which may lead to degradation of the respective trumpet arm at the flange/arm transition 306.

The trumpet arms described herein are configured with internal buttresses, and in some embodiments external buttresses (gussets, trusses), to assist in mitigating stress at the flange/arm transition 306. As further described herein with respect to FIGS. 4-20, internal buttresses positioned inside the housing 212 may extend at least a first portion of a flange length 308 of the flange 214, through the flange/arm transition 306, and at least a portion of an arm length 312 of the arm section 222. As shown in FIGS. 2-3, the arm section 222 has a rectangular shape with a rectangular cross section in the z-x plane, with respect to the axis system 150. As described with respect to FIG. 13, the arm section may have a cross section which is a square, circle, oval, hour glass, or other shape in other embodiments of the trumpet arm. The different cross sections of the arm section 222 are configured to enable different configurations of internal buttresses formed two or more legs, as further described with respect to FIG. 13. The cross section of the arm section may maintain a constant profile through the arm length 312. Additionally, the outlet 220 of the trumpet arm (e.g., the first trumpet arm 216 and the second trumpet arm 218) may be annular, as shown herein, or may have the same shape as the cross section of the arm section 222 in other embodiments. For example, the outlet 220 of the arm section 222 may be configured to have a spindle (e.g., the first spindle 224, the second spindle 226) coupled thereto, and/or to couple directly to a non-rotating portion of a driving wheel. In this way, the configuration of the trumpet arm (e.g., the first trumpet arm 216 and the second trumpet arm 218) enables electric axle components to be included in a rectangular envelope 310 of the electric drive axle while achieving a desired rigidity and strength of the electric drive axle at the flange/arm transition and along the length of the arm section 222.

Figure 4:
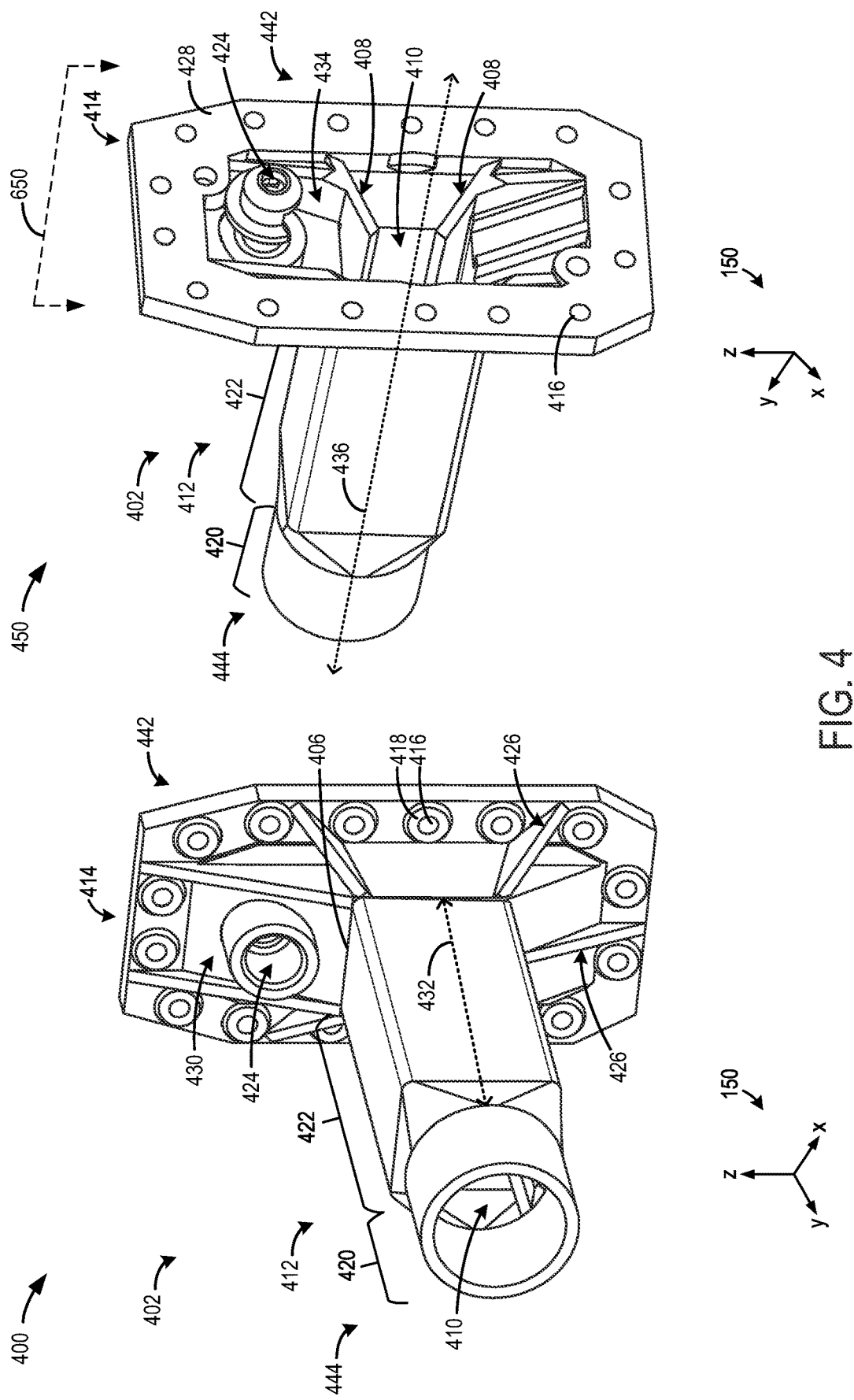
FIG. 4 shows perspective views of a trumpet arm.

FIG. 4 shows a first perspective view 400 and a second perspective view 450 of a trumpet arm 402 in orientations which enable partial visualization of internal buttresses. The trumpet arm 402 is an example of the first trumpet arm 216 and the second trumpet arm 218 of FIGS. 2-3, and elements of FIGS. 2-3 which are included in FIG. 4 may be similarly numbered (e.g., the flange 214 of FIG. 2-3 is equivalent to a flange 414 of FIG. 4).

The trumpet arm 402 comprises a housing 412 with an arm section 422 extending an arm length 432, the arm section 422 having an outlet 420 at a second end 444, and a flange 414 with a planar face 428 at a first end 442 opposite the second end 444. The trumpet arm 402 further including internal buttresses 408 positioned in an interior 410 of the housing 412 and extending through at least a first portion of a flange length of the flange 414, a flange/arm transition 406 at which the flange 414 transitions into the arm section 422, and at least a portion of the arm length 432, as further described with respect to FIGS. 6, 9, and 11. The internal buttresses 408 may be cast as part of the housing 412 (e.g., continuous with housing 412). In some embodiments, the internal buttresses 408 are formed as pieces separate from the housing 412 (e.g., castings, stampings, formed pieces, machined pieces) and welded or otherwise fixedly positioned in the interior 410 of the housing 412. The housing 412 and the internal buttresses 408 may be formed of a same material, such as cast steel, nodular iron, or cast aluminum. In other embodiments, the housing 412 and the internal buttresses 408 may be formed of different metals or other rigid materials. In yet other embodiments, the housing 412 and internal buttresses 408 may be formed as various cast, stamped, or machined components fixtured and assembled as a weldment.

As briefly described with respect to FIGS. 1-3, the flange 414 has multiple through holes 416, positioned around a perimeter of the flange 414, which are configured to have fastening attachments, such as bolts, pass through to couple the trumpet arm 402 to the electric axle components, such as a gearbox housing and/or an electric machine housing. In some embodiments, each of the multiple through holes 416 have a raised bolt pad 418, which may assist in positioning a fastening attachment, such as a bolt, and distributed bolt loading. The raised bolt pad 418 may further aid in manufacturing of the trumpet arm 402. In some embodiments, the raised pads may or may not be used. For example, a spot face may be used instead. The flange 414 further has an angled extension 430 from the planar face 428 to the flange/arm transition 406. The angled extension 430 includes an actuator through hole 424, in which an actuator for a differential lock may be positioned, as further described with respect to FIGS. 10 and 11. The angled extension 430 also includes external buttresses (gussets, trusses) 426 which may be formed as three-dimensional triangles, where a first face of a triangle is coupled to and/or continuous with the planar face 428, and a second face of the triangle is coupled to and/or continuous with the angled extension 430. In this way, the external buttresses (gussets, trusses) 426 provide additional support and rigidity to the flange 414 and to the flange/arm transition 406, as further described with respect to FIG. 12.

Both the first perspective view 400 and the second perspective view 450 show geometry of the housing 412, wherein the arm section 422 has a rectangular shape which extends along the arm length 432, and the outlet 420 has an annular shape. The arm section 422 may gradually transition into the outlet 420, such that the rectangular shape smoothly transitions to the annular shape without sharp (e.g., angled) intersections. The rectangular shape of the arm section 422 may provide space in the interior 410 of the trumpet arm 402 for internal buttresses 408 to be positioned and for positioning an axle shaft (e.g., the axle shaft 115, 117) therein. The arm section 422 is further shaped to enable mounting of suspension packages having different shapes and sizes (e.g., from different manufacturers) thereon. The annular shape of the outlet 420 may enable the axle shaft to be positioned therein without being in contact with the housing 412. The annular shape of the outlet 420 may further enable a spindle (e.g., the first spindle 224, the second spindle 226) to be coupled thereto. In other embodiments, the outlet 420 may be directly coupled to a non-rotating portion of a drive wheel. In other embodiments of the trumpet arm 402 (e.g., as described with respect to FIG. 13) may have a different shaped cross section, which may be configured to enable mounting different suspension packages thereon and/or integration of the trumpet arm 402 in different sizes and shapes of e-axle for different vehicle types, for example.

Figure 9:
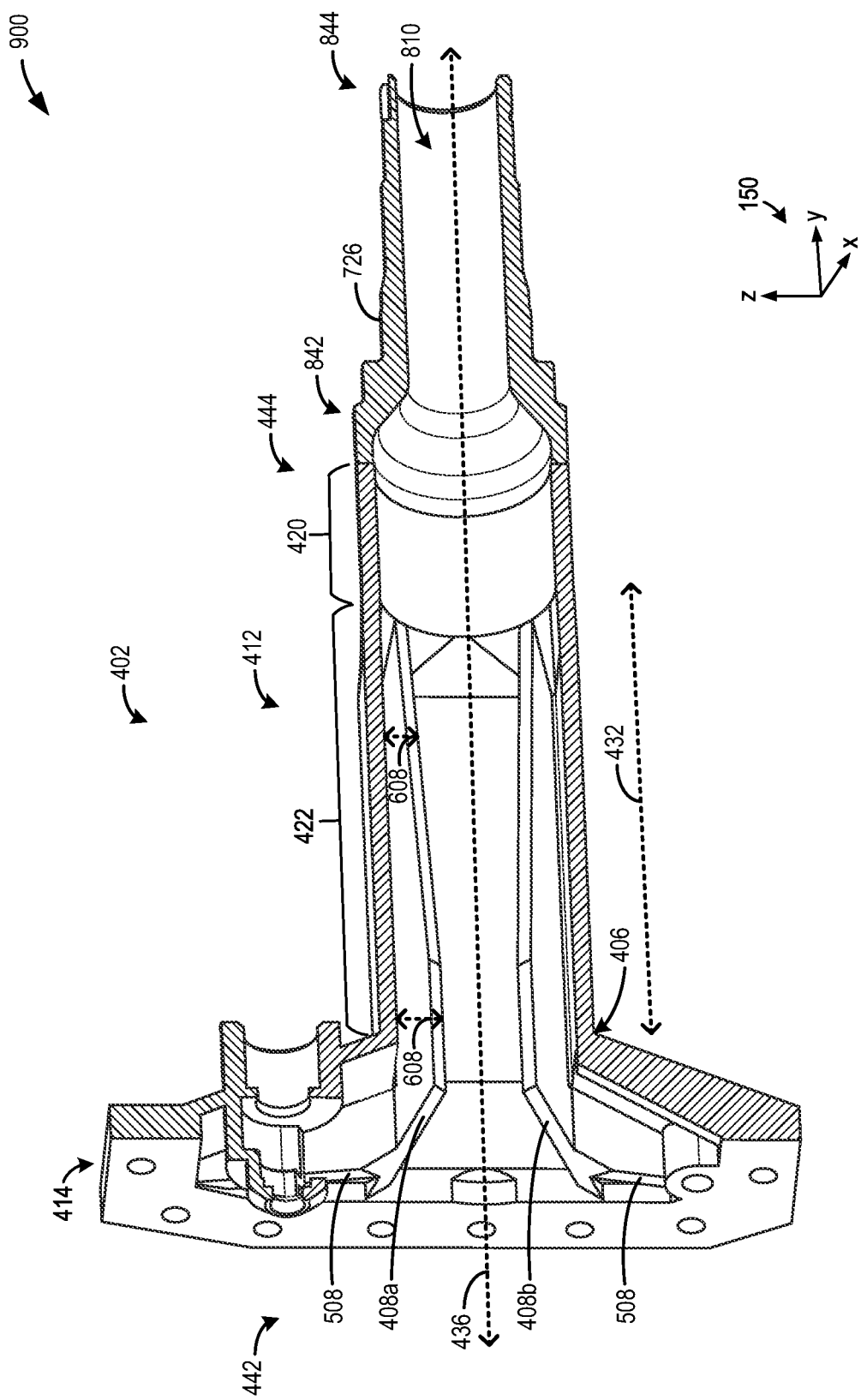
FIG. 9 shows a cross section view of the trumpet arm with the spindle.

As may be visualized in the second perspective view 450, an interior area 434 of the flange 414 decreases from the first end 442 towards the flange/arm transition 406. The internal buttresses 408 include one or more legs which are continuous with the housing 412. In the trumpet arm 402, the internal buttresses 408 include four legs, as further described with respect to FIG. 5. Each of the four legs extends from the planar face 428 and the angled extension 430 towards a central axis 436 of the trumpet arm 402. Each of the four legs further extends into the arm section 422 of the housing 412, and are each coupled to and/or continuous with walls of the arm section 422. As shown in FIGS. 6, 9, and 11, each of the four legs of the internal buttresses 408 extend through at least a first portion of the flange length, the flange/arm transition 406 at which the flange 414 transitions into the arm section 422, and at least a portion of the arm length 432. The four legs of the internal buttresses 408 form an "x" configuration in the example of the trumpet arm 402 shown in FIG. 5, however in other embodiments of the trumpet arm 402, the internal buttresses 408 may be formed of more than four or less than four legs which are arranged in different configurations to provide resistance to deflection stresses along the arm length 432 of the arm section 422 and at the flange/arm transition 406. Additional configurations of the internal buttress 408 are described with respect to FIG. 13.

Inclusion of external buttresses (gusset, trusses) 426 as well as internal buttresses 408 create a first pivot point at the planar face 428 of the flange 414 and a second pivot point at the flange/arm transition 406, as further described with respect to FIG. 12. Briefly, looking at a top portion of trumpet arm 402 in an illustration 1250, a first pivot point 1202 and a second pivot point 1204 are both rigid when the arm section 422 experiences deflection in a first, downward direction indicated by a second arrow 1220 and a third arrow 1222 (e.g., towards a driving surface) due to the internal buttresses 408 being in compression and the external buttresses (gusset, trusses) 426 being in tension. As shown in an illustration 1200, the first pivot point 1202 and the second pivot point 1204 are both rigid when the arm section 422 experiences deflection in a second, upward direction indicated by a first arrow 1206 (e.g., away from the driving surface) due to the internal buttresses 408 being in tension and the external buttresses (gusset, trusses) 426 being in compression.

Figure 5:
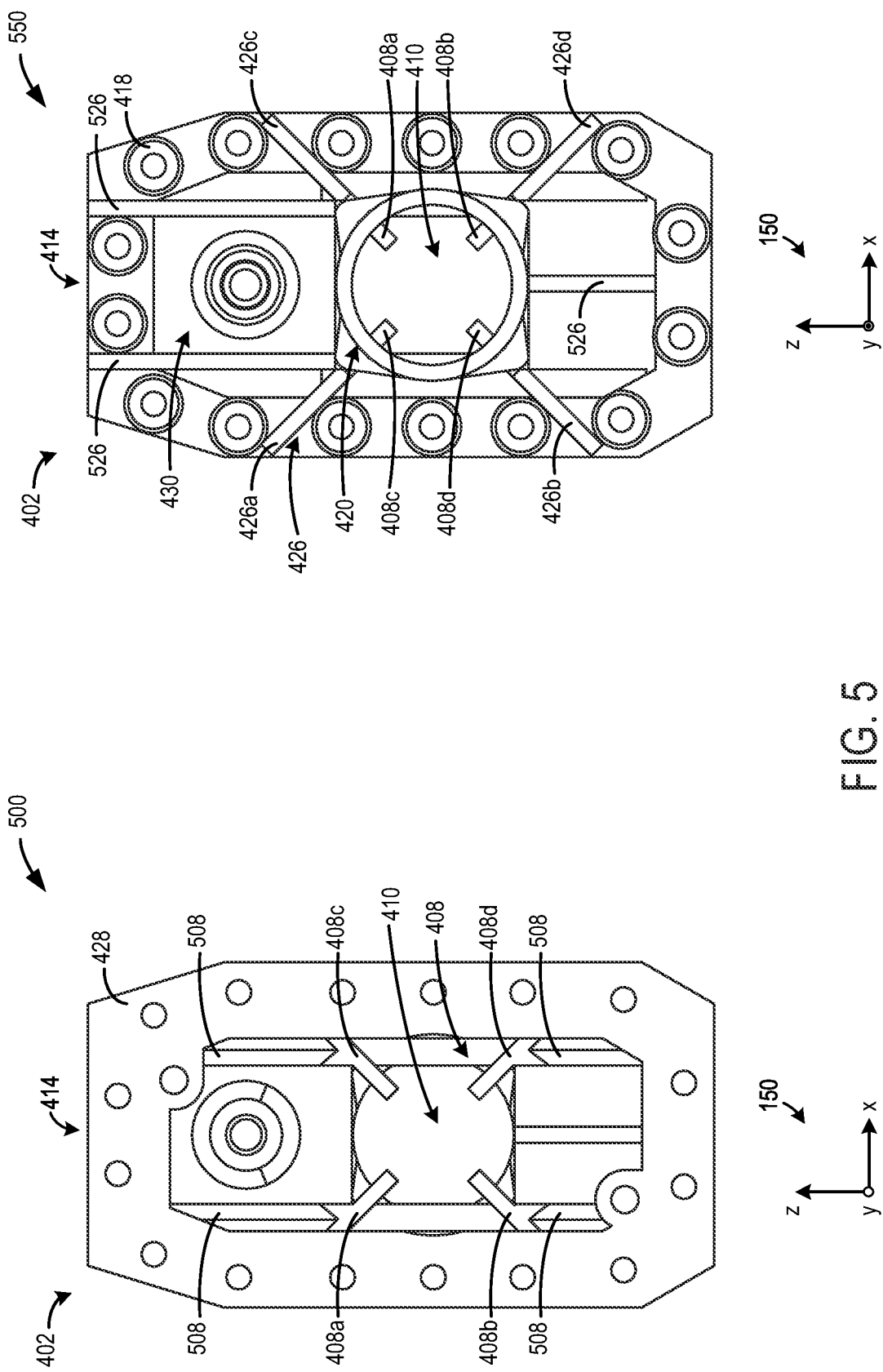
FIG. 5 shows profile views of the trumpet arm of FIG. 4.
Figure 6:
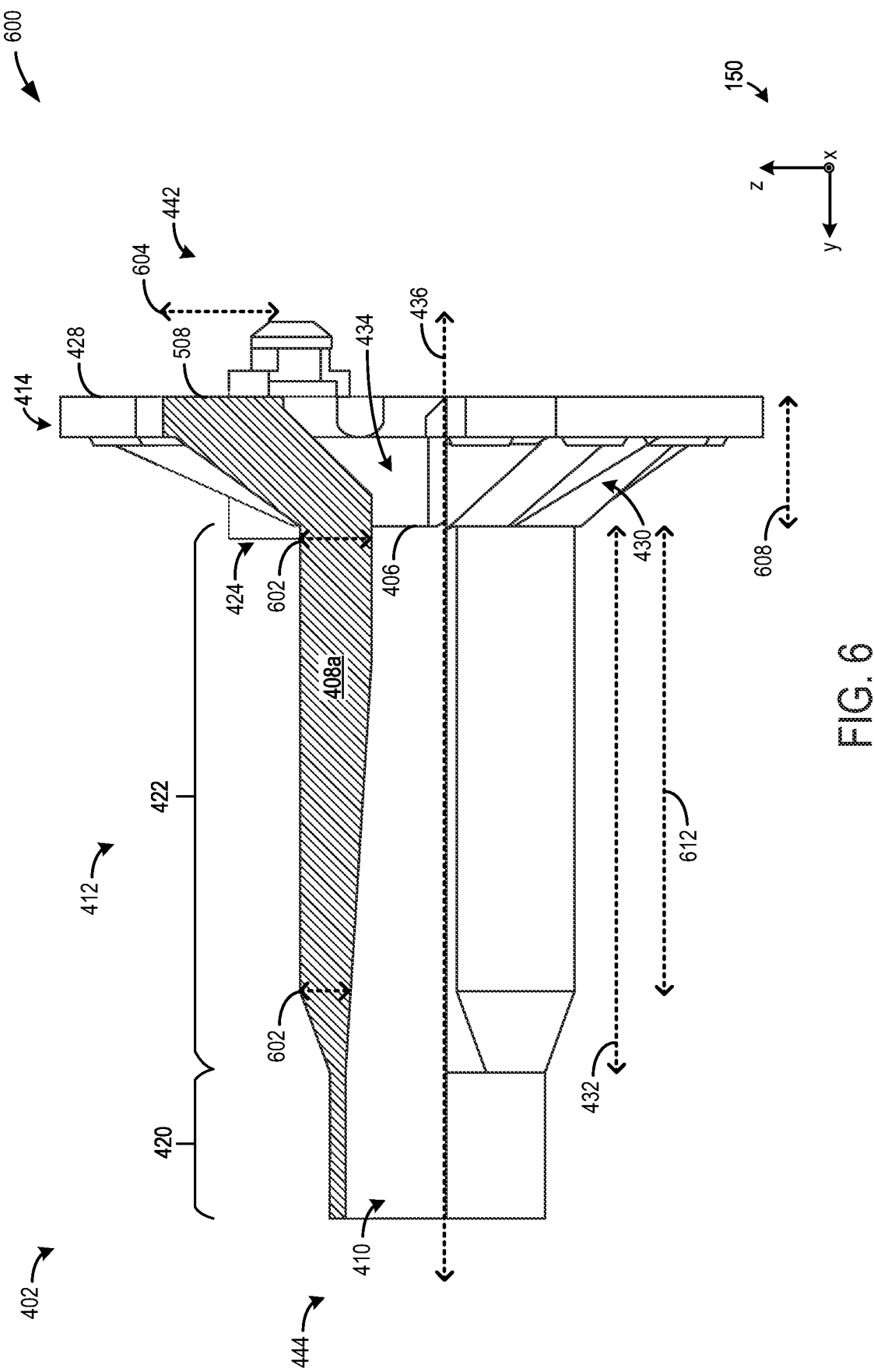
FIG. 6 shows a cross section view of the trumpet arm.

FIG. 5 shows a first profile view 500 and a second profile view 550 of the trumpet arm 402 of FIG. 4. Elements of the trumpet arm 402 which are described with respect to FIG. 4 may not be reintroduced, for brevity. The first profile view 500 shows the trumpet arm 402 along the y-axis, looking into the interior 410 of the trumpet arm 402 from the flange 414 to the outlet 420 (e.g., from the first end 442 of the housing 412 to the second end 444, as described with respect to FIG. 4). The second profile view 550 shows the trumpet arm 402 along the y-axis, looking into the interior 410 of the trumpet arm 402 from the outlet 420 to the flange 414 (e.g., from the second end 444 of the housing 412 to the first end 442).

As described with respect to FIG. 4, the internal buttresses 408 have an "x" configuration with vertical extensions 508 of each of the four legs (e.g., a first leg 408a, a second leg 408b, a third leg 408c, and a fourth leg 408d) coupling the internal buttresses 408 to arm section 422 and to the angled extension 430. The vertical extensions 508 are to be understood as extensions of the "x" configuration which provide support for the internal buttress 408 in the flange 414, for example, by anchoring the internal buttresses 408 to the flange 414. The "x" configuration may be visualized in the first profile view 500 and the second profile view 550 of FIG. 5. The external buttresses (gusset, trusses) 426 also have an "x" configuration, where legs of the external buttresses 426 (e.g., a fifth leg 426a, a sixth leg 426b, a seventh leg 426c, and an eighth leg 426d) may be axially aligned with legs of the internal buttresses 408. The external buttresses 426 may also include external vertical extensions 526, which may assist in supporting (e.g., providing structural stability and rigidity to) the angled extension 430 of the flange 414.

Configuration of the internal buttresses 408 and the external buttresses (gusset, trusses) 426 in the "x" configuration may enable the internal buttresses 408 and the external buttresses 426 to react to both vertical and horizontal forces and torsional forces on the trumpet arm 402, and thus on the internal buttresses 408 and external buttresses 426. For example, the internal buttresses 408 and the external buttresses 426 may experience vertical forces when a vehicle having the e-axle which uses the trumpet arm 402 (e.g., the vehicle 100 of FIG. 1) travels over protrusions and/or depressions in a driving surface (e.g., speed bumps, potholes). The internal buttresses 408 and the external buttresses 426 may experience horizontal forces and torsional forces when the vehicle brakes and/or accelerates. As further described with respect to FIG. 12, the internal buttresses 408 and external buttresses (gusset, trusses) 426 may enable pivot points of the trumpet arm 402 to remain rigid when the trumpet arm experiences vertical and/or horizontal forces (e.g., deflection of the trumpet arm), which may reduce degradation of the trumpet arm 402, especially at the flange/arm transition 406.

FIG. 6 shows a cross section side view 600 of the trumpet arm 402. The cross section of FIG. 6 is a partial cross section taken along the central axis 436, where elements above the central axis 436 are sectioned as indicated by line 650 of FIG. 4, and elements below the central axis 436 are not cross-sectioned. Elements of the trumpet arm 402 which are described with respect to FIGS. 4 and 5 may not be reintroduced, for brevity.

As described with respect to FIGS. 4 and 5, the flange 414 of the trumpet arm 402 has a flange length 608, the arm section 422 has the arm length 432, and the internal buttresses 408 extend through at least a first portion of the flange length 608, the flange/arm transition 406, and at least a portion of the arm length 432. FIG. 6 illustrates an embodiment of a configuration of the internal buttresses 408 in the housing 412 of the trumpet arm 402. In the embodiment of the trumpet arm 402, the internal buttresses 408 include four legs in an "x" configuration, as described above. Shown in FIG. 6 is a cross section of the first leg 408a. The first leg 408a extends along the entirety of the flange length 608 and the arm length 432. As described with respect to FIG. 5, each of the four legs of the internal buttresses 408 includes the vertical extension 508, which extends linearly towards the central axis 436 for a first length 604. The first leg 408a extends along the angled extension 430 of the flange 414 at an angle parallel to that of the angled extension 430 for a second portion of the flange length 608. Prior to the flange/arm transition 406, the first leg 408a transitions from the angle parallel to the angled extension 430 to a horizontal extension which is parallel to the arm section 422. A width 602 of the first leg 408a may gradually decrease along the arm length 432, where the width 602 of the first leg 408a is greatest at the flange/arm transition 406. In this way, the configuration of the first leg 408a, and thus, of the four legs of the internal buttresses 408, may provide rigidity and resistance to degradation at the flange/arm transition 406 and along the arm length 432, as further described herein and with respect to FIG. 12. As further described with respect to FIG. 13, different embodiments of the internal buttresses 408 may include more than or less than four legs which are oriented in a different configuration than the "x" configuration.

The flange 414 is configured to provide a rectangular envelope for positioning electric axle components in an e-axle. The planar face 428 may be a face on the first end 442 of a plate or other planar structure, in some embodiments. The angled extension 430 is coupled to and/or continuous with, and extends from the plate or planar structure having the planar face 428 in a direction away from the planar face 428 (e.g., towards the second end 444). The angled extension 430 has a funnel-like shape, where the interior area 434 of the flange 414 decreases from the first end 442 towards the flange/arm transition 406. External buttresses (gusset, trusses) 426 which extend along an exterior 610 of the angled extension 430 may provide rigidity and resistance to degradation due to stress by being coupled to and/or extending from the angled extension 430 and the plate or planar structure having the planar face 428. In other embodiments, the flange 414 has a different shape and configuration. For example, as further described with respect to FIGS. 14A-20, instead of an angled extension, the flange may have a curved extension from the planar face (e.g., a plate or planar structure having the planar face) to the flange/arm transition. The embodiment of the flange described with respect to FIGS. 14A-20 may provide structural stability and resistance to degradation due to stress in a similar way to the flange 414 described herein.

The arm length 432 and the shape (e.g., cross section) of the arm section 422 may be configured to enable mounting or other forms of coupling of different suspension mounting packages to the arm section 422. Different suspension mounting packages may be designed by the same or different manufacturers than those who manufacture the trumpet arm 402, thus the arm section 422 is sized to sufficiently accommodate different shapes and sizes of suspensions mounting packages. In some embodiments, a suspension mounting package may be coupled to the trumpet arm 402 along parts of or all of the arm length 432. For example, a suspension mounting package may be coupled to the trumpet arm 402 along a portion 612 of the arm section 422 and not coupled to the trumpet arm 402 at the portion of the arm length 432 where the rectangular shape of the arm section 422 transitions into the annular shape of the outlet 420. As further described herein, different embodiments of the trumpet arm may have differently shaped arm sections (e.g., circular cross section, hour glass cross section, and so on), all of which may be configured to accommodate multiple different suspension mounting packages.

Figure 7:
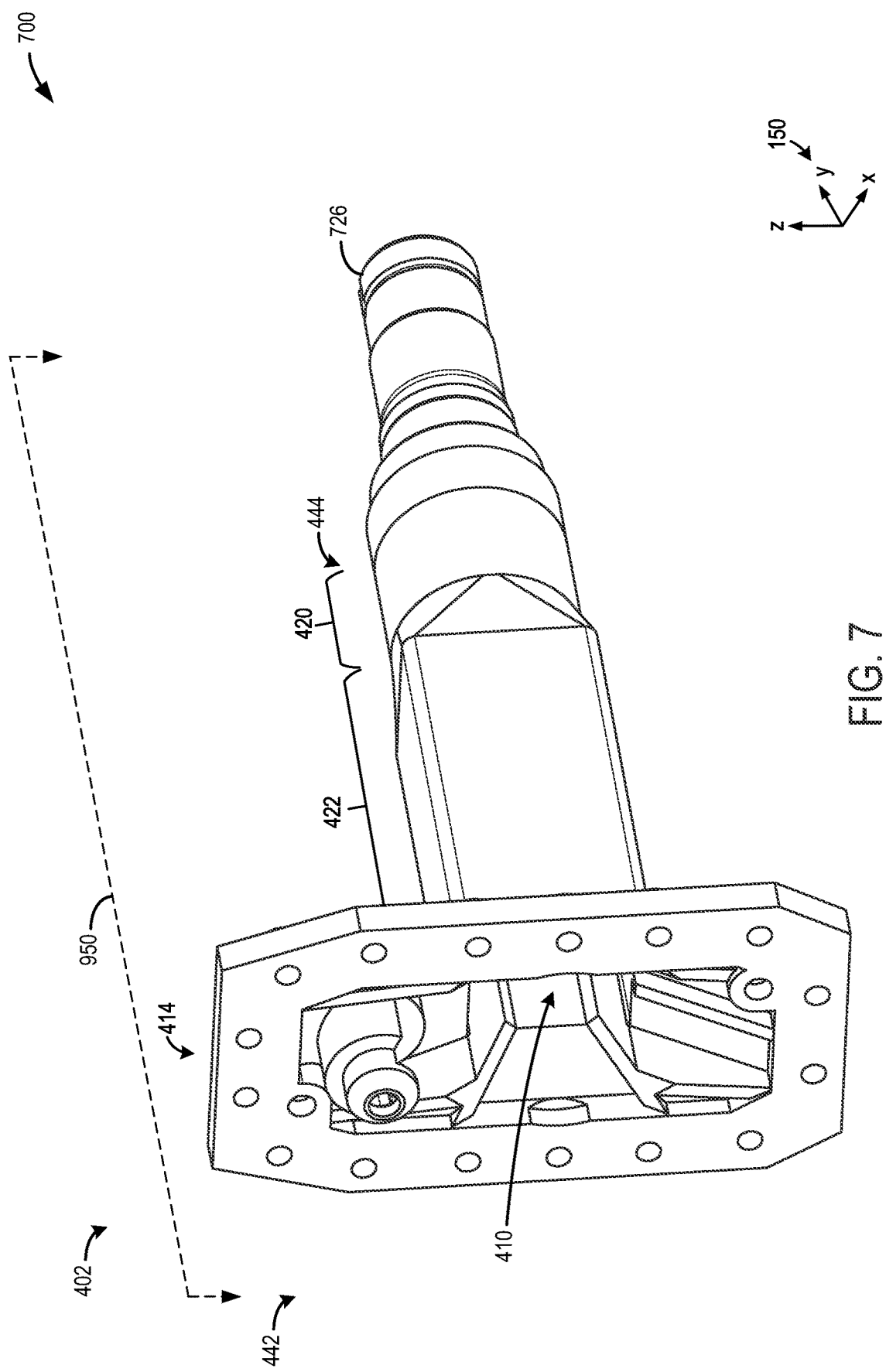
FIG. 7 shows a first perspective view of a trumpet arm with a spindle.

FIG. 7 shows a first perspective view 700 of the trumpet arm 402, as described with respect to FIGS. 4-6, with a spindle 726 coupled to the trumpet arm 402 at the outlet 420. The spindle 726 may be an example of the first spindle 224 or the second spindle 226, as described with respect to FIGS. 1-3. The spindle 726 may be coupled to the trumpet arm 402 via friction welding, for example. As described with respect to FIGS. 1-3, an axle shaft which provides rotational motion to drive wheels from a rotational power source (e.g., the electric machine 106) may pass through the interior 410 of the trumpet arm 402 and through an interior of the spindle 726 to couple to a drive wheel. In some embodiments, the spindle 726 may be coupled to a non-rotatable element of the drive wheel. In other embodiments, the spindle 726 may be adjacent to and axially aligned with a center of the drive wheel, but may not be in contact with the drive wheel.

Figure 8:
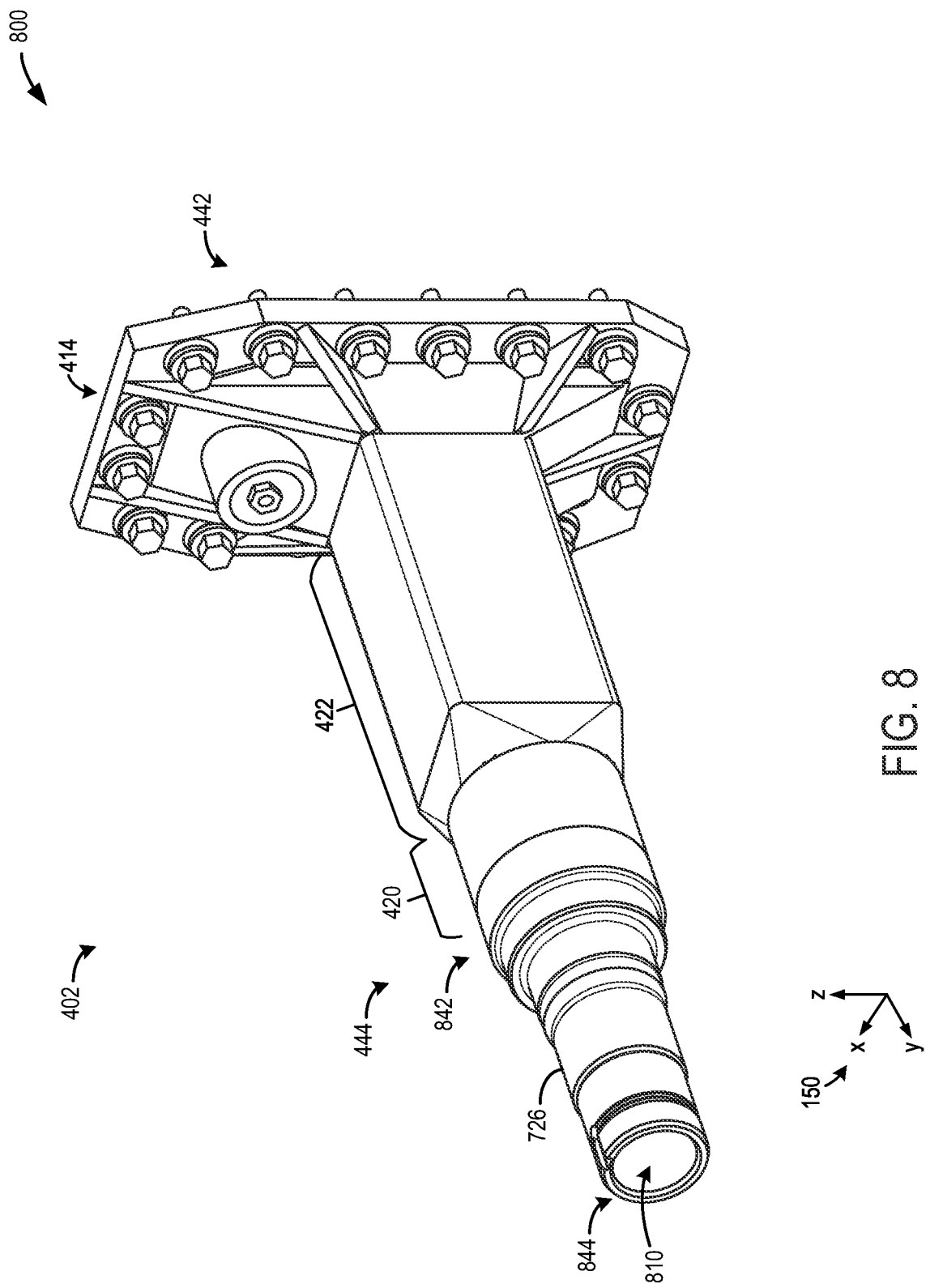
FIG. 8 shows a second perspective view of the trumpet arm with the spindle of FIG. 7.

FIG. 8 shows a second perspective view 800 of the trumpet arm 402 with the spindle 726 coupled thereto, as described with respect to FIG. 7. The spindle 726 is coupled to the trumpet arm 402 at the outlet 420. The spindle 726 is coupled to the trumpet arm 402 at a first end 842 of the spindle 726, and a drive wheel (not shown) may be coupled to the spindle 726 at a second end 844 of the spindle 726, opposite the first end 842 of the spindle 726. As described with respect to FIG. 7, an axle shaft which provides rotational motion to drive wheels from a rotational power source may pass through the interior of the trumpet arm 402 and through an interior 810 of the spindle 726 to couple to a drive wheel. In some embodiments, the axle shaft may protrude out of the second end 844 of the spindle 726, where the axle shaft may be coupled to the drive wheel and the spindle 726 is not in contact with the drive wheel.

FIG. 9 shows a first cross section side view 900 of the trumpet arm 402 with the spindle 726 coupled thereto, as described with respect to FIG. 7. The first cross section side view 900 sections the trumpet arm 402 with the spindle 726 along the line 950, shown in FIG. 7. As described with respect to FIGS. 4-8, legs of the internal buttresses 408 extend from the flange 414, through the flange/arm transition 406, and along the arm length 432 of the arm section 422. In the embodiment of the trumpet arm 402 shown in FIG. 9, legs of the internal buttresses 408 (e.g., the first legs 408a and the second legs 408b) extend in an "x" configuration towards the central axis 436 of the trumpet arm 402. Described another way, each of the first legs 408a and the second legs 408b (and the third legs 408c and the fourth legs 408d, not shown in FIG. 9) extend from a respective vertical extension 508 at an angle, towards the central axis 436 of the trumpet arm 402 in such a way that there is space between each of the legs of the internal buttresses, as well as space between the internal buttresses 408 and the housing 412 (e.g., walls of the arm section 422). As further shown in FIG. 9, the width 602 of legs of the internal buttresses 408 may decrease along the arm length 432, in some embodiments. Described another way, the legs of the internal buttresses 408 may, for a portion 612 of the arm length 432 and while still being in the "x" configuration, flare away from the central axis 436 of the trumpet arm 402. This configuration may provide strength and rigidity to the arm section 422 while providing space for positioning of the axle shaft. As described herein, the internal buttresses 408 may not extend into the spindle 726. The internal buttresses 408 thus provide rigidity and resistance to degradation of the trumpet arm 402 at the flange 414, at the flange/arm transition 406, and along the arm length 432 of the arm section 422.

Figure 10:
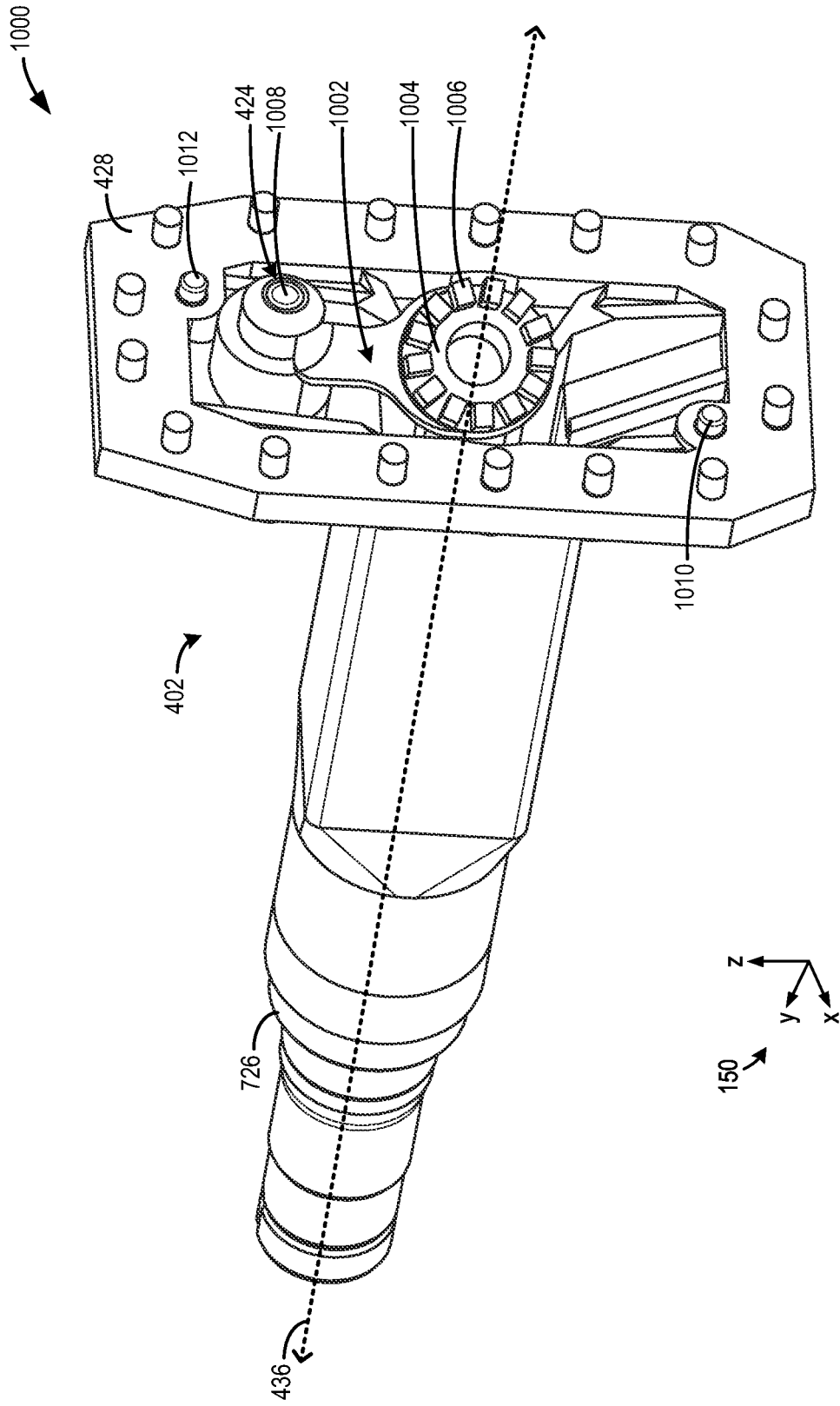
FIG. 10 shows a perspective view of a trumpet arm with a spindle and a differential lock/axle disconnect assembly.

FIG. 10 shows a third perspective view 1000 of the trumpet arm 402 with the spindle 726, as described with respect to FIGS. 7-9. The embodiment of the trumpet arm 402 shown in FIG. 10 further includes elements which may assist in positioning the trumpet arm 402 with respect to electric axle components, such as a gearbox, a differential, and/or an electric machine, as described with respect to FIGS. 1-3. A differential lock/axle disconnect assembly 1002 may be positioned in the flange 414, and may comprise a shift fork and a sliding collar 1004 which are coupled to a differential lock/axle disconnect actuator 1008 which is positioned in the actuator through hole 424. The differential lock/axle disconnect assembly 1002 may be positioned in the flange 414 such that a through hole of the sliding collar 1004 is aligned with the central axis 436 of the trumpet arm 402. This alignment may enable the axle shaft to pass through the through hole of the sliding collar 1004. In other embodiments, the axle shaft may be coupled to the sliding collar 1004 on a second face of the sliding collar 1004 opposite a first face of the sliding collar 1004 having teeth 1006. The sliding collar 1004 may be actuated to selectively engage with a differential (e.g., the differential 110 of FIG. 1), and thus control rotation of the axle shaft coupled to the sliding collar 1004 (e.g., enable rotation by engaging the sliding collar 1004 with the differential). In other embodiments, the shift fork and the sliding collar 1004 are configured to selectively mate with a mating clutch of the gearbox (e.g., the gearbox 108 of FIG. 1) to control rotation of the axle shaft positioned in the trumpet arm 402 and coupled to a drive wheel (not shown). Operation of the differential lock/axle disconnect actuator is further described with respect to FIG. 11.

The trumpet arm 402 may further include one or more locating dowels to assist in positioning the trumpet arm 402 with respect to electric axle components (e.g., the gearbox 108, the differential 110, the electric machine 106, and/or housings thereof). For example, the trumpet arm 402 may include a first locating dowel 1012 which extends from an upper right corner of the planar face 428 towards the first end 442 and a second locating dowel 1010 which extends from a lower left corner of the planar face 428 towards the first end 442. The first locating dowel 1012 and/or the second locating dowel 1010 may extend into and couple the trumpet arm 402 to the gearbox of the e-axle, for example. The trumpet arm 402 may additionally or alternatively include one or more pilot diameters, not shown, which extend into or out of the flange 414 and are configured to receive one or more mating diameters of the electric machine to locate the trumpet arm 402 to the electric machine.

FIG. 11 shows a second cross section side view 1100 of the trumpet arm 402 with the spindle 726, the differential lock/axle disconnect assembly 1002, and the differential lock/axle disconnect actuator 1008 coupled thereto, as described with respect to FIG. 10. As described with respect to FIG. 10, the shift fork and the sliding collar 1004 of the differential lock/axle disconnect assembly 1002 are configured to mate with a mating clutch 1104 of the electric machine (e.g., the electric machine 106 of FIG. 1). In the embodiment of FIG. 11, the mating clutch 1104 is shown as a Curvic clutch. However, in other embodiments, the mating clutch 1104 with which the sliding collar 1004 selectively mates may be any one of a dog clutch, a synchronizer clutch, a cone clutch, a dry clutch, a wet clutch, friction plates, and so on without departing from the scope of the present disclosure. The differential lock/axle disconnect actuator 1008 may extend through the flange length 608 of the flange 414 at the actuator through hole 424, thus enabling the differential lock/axle disconnect actuator 1008 to selectively engage with components (e.g., the differential, elements of a suspension package mounted on the arm section 422, and/or other element of the e-axle) on either of the first end 442 or the second end 444 of the trumpet arm 402. The differential lock/axle disconnect actuator 1008 and the differential lock/axle disconnect assembly 1002 may be pneumatically, electromechanically, hydraulically, and/or magnetically actuated, in one instance.

FIG. 12 shows illustrations 1200 and 1250 of force distribution on the trumpet arm described herein having internal buttresses and external buttresses (gusset, trusses) (e.g., the trumpet arm 402 of FIGS. 4-11). As described herein, inclusion of the internal buttresses and external buttresses in the trumpet arm (e.g., the trumpet arm 402) provide strength and rigidity at the flange/arm transition and along the arm section, which may provide resistance to degradation of the trumpet arm due to stresses from deflection of the trumpet arm. For example, the internal buttresses and the external buttresses (gusset, trusses) may enable pivot points of the trumpet arm to be rigid during deflection of the trumpet arm.

As briefly described with respect to FIG. 3, when traveling along a road, a vehicle may experience deflection along a vertical axis when encountering bumps and/or holes in the roadway, and deflection along a longitudinal axis from braking/accelerating. The trumpet arm described herein is configured to distribute deflection in such a way that provides rigidity to the electric drive axle in which it is used, thus reducing degradation of the trumpet arm, the electric drive axle, and other components thereof. In simplified examples, deflection of the trumpet arm along a vertical axis (e.g., the z-axis with respect to the axis system 150, perpendicular to road surface) results in two pivot points that the trumpet arm deflects up/down about the pivot points. A first pivot point 1202 is positioned at an intersection of the planar face 428 and the angled extension 430 of the flange 414. A second pivot point 1204 is positioned at the flange/arm transition 406. Incorporating internal buttresses 408 which extend from the flange 414 along the inside of the arm section 422 stiffens the second pivot point 1204 and adds strength along the arm section 422. Incorporating the external buttresses (gusset, trusses) 426 outside the flange 414 (e.g., on the angled extension 430) stiffens the first pivot point 1202.

Illustration 1200 shows a cross section side view of a top portion of the trumpet arm 402 (e.g., above the central axis 436 of FIG. 11). As shown in illustration 1200, when a load (indicated by the first arrow 1206) is directing the trumpet arm 402 up (e.g., away from a driving surface), the external buttresses (gusset, trusses) 426 is in compression along a first side 1208. The internal buttress 408 is in tension along a second side 1210 and a third side 1212. The trumpet arm 402 deflects up with respect to the y-axis, as indicated by a first dashed line 1214, at a reduced amount and with lower stresses at the first pivot point 1202 and the second pivot point 1204, relative to deflection of trumpet arms without internal buttresses (gusset, trusses) and/or external buttresses.

Illustration 1250 shows a cross section side view of the trumpet arm 402. A bottom half 1254 of the trumpet arm 402 experiences deflection as described below. A top half 1252 of the trumpet arm 402 may be understood as experiencing deflection as described with respect to illustration 1200. The configuration of the internal buttresses 408 and external buttresses (gusset, trusses) 426, as well as the direction of load on the bottom half of the trumpet arm 402 may be equivalent to the top half 1252 of the trumpet arm, reflected over the central axis 436. Described another way, both the top half 1252 and the bottom half 1254 of the trumpet arm 402 experience load in a downward direction, as indicated by the second arrow 1220 and the third arrow 1222. The trumpet arm 402 thus includes a pair of first pivot points 1202 at the intersection of the planar face 428 and the angled extension 430 of the flange 414, and a pair of second pivot points 1204 at the flange/arm transition 406. For the top half 1252 of the trumpet arm 402, when the load is going down, the external buttress (gusset, trusses) 426 is in tension along the first side 1208. The internal buttress 408 is in compression along the second side 1210 and the third side 1212. The trumpet arm 402 deflects down with respect to the y-axis, as indicated by a second dashed line 1216, at a reduced amount and with lower stress at the pair of first pivot points 1202 and the pair of second pivot points 1204 relative to deflection of trumpet arms without external buttresses and/or internal buttresses. For the bottom half 1254 of the trumpet arm 402, when the load is going down, the external buttress (gusset, trusses) 426 is in compression, along a first side 1208. The internal buttress 408 is in tension along the second side 1210 and the third side 1212. The trumpet arm 402 deflects down with respect to the y-axis, as indicated by a third dashed line 1218, at a reduced amount and with lower stresses at the pair of first pivot points 1202 and the pair of second pivot points 1204, relative to deflection of trumpet arms without external buttresses and/or internal buttresses. Reduced deflection of the trumpet arm may increase a useable lifespan of the trumpet arm and of the e-axle, as degradation of the trumpet arm at the first pivot point and at the second pivot point may be decreased due to strength and rigidity of the trumpet arm provided by the internal buttresses and external buttresses.

An embodiment of a trumpet arm is described with respect to FIGS. 4-12, the trumpet arm comprising a housing with an arm section extending an arm length, the arm section having an outlet at a first end, and a flange with a planar face at a second end opposite the first end; and internal buttresses positioned in an interior of the housing and extending through at least a first portion of a flange length of the flange, a flange/arm transition at which the flange transitions into the arm section, and at least a portion of the arm length. Different embodiments of the trumpet arm which include the elements described above may include different geometries which may be used to configure the trumpet arm to be used in different systems, such as e-axles for different sized and shaped vehicles. For example, a cross-section of the arm section may be adjusted during manufacturing of the trumpet arm to form embodiments of the trumpet arm which may be implemented in an electric drive system for a passenger vehicle, a heavy duty vehicle, and so on. Additionally or alternatively, the cross-section of the arm section 422 may be shaped and sized to provide space for mounting and/or coupling different suspension mounting packages thereon. Similarly, an orientation of legs of the internal buttresses of the trumpet arm may be different in different embodiments of the trumpet arm. For example, different configurations of the internal buttresses may include two or more legs. FIG. 13 shows illustrations of possible arm section cross sections 1300 and leg orientations 1350 of internal buttresses 408 for the trumpet arm described herein. The cross section of the arm section may be described as a: box 1302, rectangle 1304, circle 1308, oval 1310, hour glass 1312, or a combination 1314 of two or more of these shapes. The orientation of legs of the internal buttresses may be angled ("x" configuration 1352, as described with respect to FIGS. 4-11), "y" shaped 1354, horizontal configuration 1358, vertical configuration 1360, "+" shaped 1362, curved configuration 1364, or a combination 1366 of two or more of these orientations.

FIGS. 14A-20 show a second embodiment of the trumpet arm described herein. Similarly to the trumpet arm 402 described with respect to FIGS. 4-11, the trumpet arm 1402 includes a flange with a planar face, where the flange is coupled to an arm section at a flange/arm transition on a side of the flange opposite the planar face. As further described with respect to FIGS. 14A-20, the flange of the trumpet arm 1402 includes a curved extension from the planar face to the flange/arm transition. The curved extension may have the same or similar benefits as the angled extension of the trumpet arm 402, where the flange of both the trumpet arm 402 and the trumpet arm 1402 provide a relatively abrupt transition at the flange/arm transition, compared to the gradual transition present in a banjo axle or a Salisbury axle. The relatively abrupt transition described herein may assist in providing a substantially sized envelope in which to package electric axle components. Internal buttresses can also provide the flange/arm transition with strength and rigidity comparable to or greater than that of the banjo axle and/or the Salisbury axle, where the internal buttresses and the curved extension provide resistance to degradation of the trumpet arm, which may be caused by deflection of the trumpet arm over time.

Figure 14A:
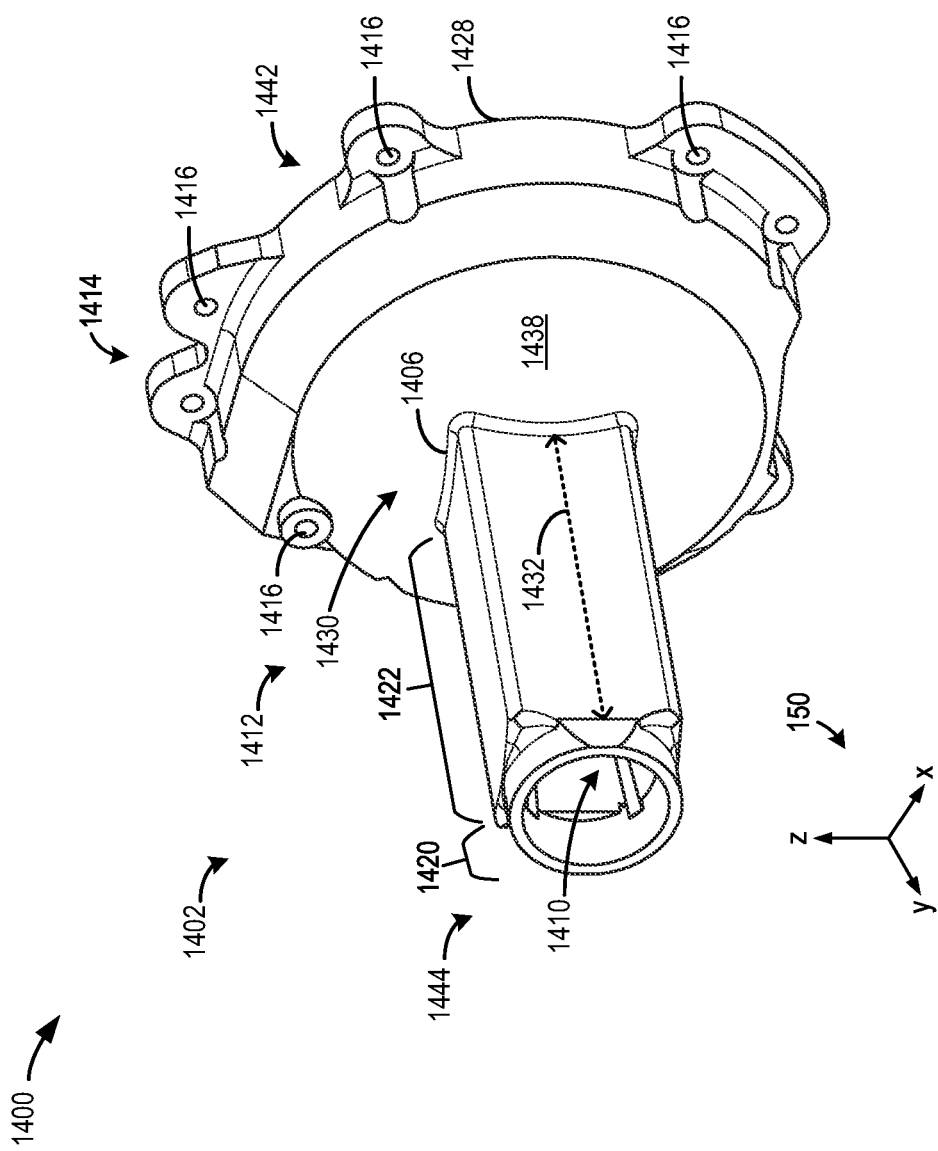
FIGS. 14A and 14B show perspective views of a trumpet arm with a curved flange.
Figure 14B:
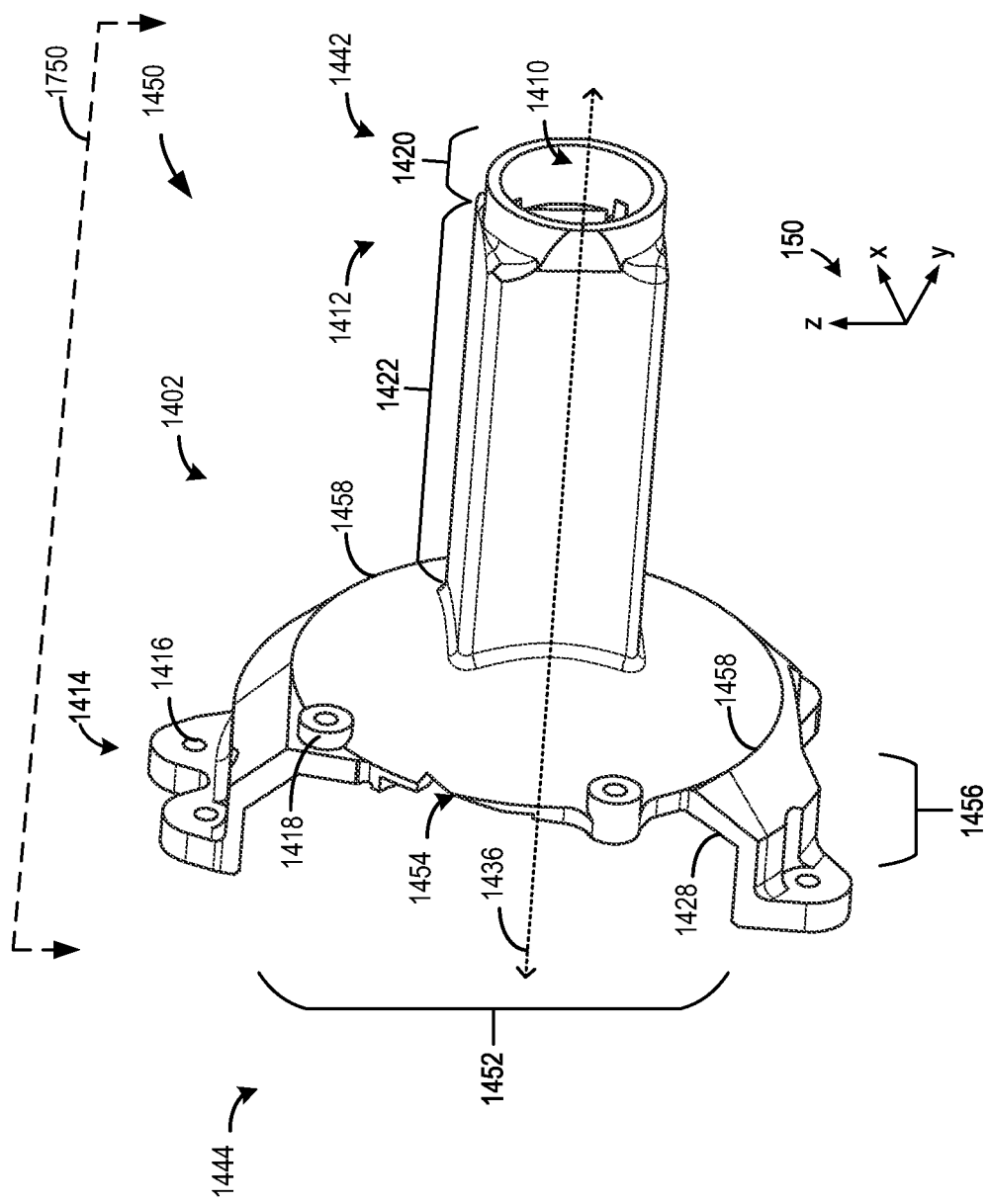

Turning to FIGS. 14A and 14B, a first perspective view 1400 and a second perspective view 1450 are shown of a trumpet arm 1402. The trumpet arm 1402 is an example of the first trumpet arm 216 and the second trumpet arm 218 of FIGS. 2-3. Elements of FIGS. 2-3 which are included in FIGS. 14A and 14B may be similarly numbered (e.g., the flange 214 of FIG. 2-3 is equivalent to a flange 1414 of FIGS. 14A and 14B). The trumpet arm 1402 comprises a housing 1412 with an arm section 1422 extending an arm length 1432, the arm section 1422 having an outlet 1420 at a second end 1444, and a flange 1414 with a planar face 1428 at a first end 1442 opposite the second end 1444. The trumpet arm 1402 further includes internal buttresses 1408 (e.g., shown in FIGS. 16, 17, and 20) positioned in an interior 1410 of the housing 1412 and extending through at least a first portion of a flange length of the flange 1414, a flange/arm transition 1406 at which the flange 1414 transitions into the arm section 1422, and at least a portion of the arm length 1432, as further described with respect to FIGS. 17 and 20. The internal buttresses 1408 may be cast as part of the housing 1412 (e.g., continuous with housing 1412). In some embodiments, the internal buttresses 1408 are formed as pieces separate from the housing 1412 (e.g., castings, stampings, formed pieces, machined pieces) and welded or otherwise fixedly positioned in the interior 1410 of the housing 1412. The housing 1412 and the internal buttresses 1408 may be formed of a same material, such as cast steel, nodular iron, or cast aluminum. In other embodiments, the housing 1412 and the internal buttresses 1408 may be formed of different metals or other rigid materials.

As briefly described with respect to FIGS. 1-3, the flange 1414 has multiple through holes 1416, positioned around a perimeter of the flange 1414, which are configured to have fastening attachments, such as bolts, pass through to couple the trumpet arm 1402 to electric axle components, such as a gearbox housing and/or an electric machine housing. In some embodiments, each of the multiple through holes 1416 may have a raised bolt pad 1418, which may assist in positioning a fastening attachment, such as a bolt, and distributed bolt loading. The raised bolt pad 1418 may further aid in manufacturing of the trumpet arm 1402. In some embodiments, the raised pads may or may not be used. For example, a spot face may be used instead. Each of the multiple through holes 1416 may be strategically positioned around the perimeter of the flange 1414 to enable alignment of each through hole 1416 with a coupling hole of a gearbox housing and/or an electric machine housing.

The flange 1414 in the second embodiment of the trumpet arm 1402 has a circular profile with a cutout 1454 along a first section 1452 of the perimeter of the flange 1414, as may be visualized in FIG. 14B. The cutout 1454 may be sized and shaped to enable components of an electric drive system (e.g., a gearbox, a differential, and/or an electric machine) to be compactly positioned within an envelope of an e-axle, the envelope formed as a space between two trumpet arms 1402, as described with respect to FIGS. 1-3. The flange 1414 further includes a curved extension 1430 which extends from the planar face 1428 to the flange/arm transition 1406. The curved extension 1430 in combination with the planar face 1428 give the flange 1414 a dome shape (convex as viewed from the second end 1444 of the housing 1412 to the first end 1442), excluding the cutout 1454. Furthermore, in another example, the curved extension 1430 in combination with the planar face 1428 may give the flange 1414 a concave shape (as viewed from the second end 1444 of the housing 1412 to the first end 1442), excluding the cutout 1454. As is further described with respect to FIGS. 15, 16, 17, 19, and 20, an interior area of the flange 1414 decreases from the planar face 1428 to the flange/arm transition 1406.

The curved extension 1430 with the cutout 1454 may provide space in which internal buttresses 1408 may be included and an axle shaft may extend through the interior 1410 of the trumpet arm 1402 without contacting the housing 1412 or the internal buttresses 1408. Additionally, and as further described herein, the curved extension 1430 may function similarly to the external buttresses (gusset, trusses) 426 of FIGS. 4-12 and provide additional support for the trumpet arm 402 and rigidity for two pivot points thereof, such that the trumpet arm 402 may be resistant to deflection and degradation due to forces in an upward/downward, forward/backward, and/or torsional direction. As described with respect to FIGS. 4-12, inclusion of external buttresses (gusset, trusses) 426 as well as internal buttresses 408 in the first embodiment of the trumpet arm 402 create a first pivot point at the planar face 428 of the flange 414 and a second pivot point at the flange/arm transition 406. The curved extension 1430 of the second embodiment of the trumpet arm 1402 may create a first pivot point around a curved perimeter 1458, where the curved extension 1430 intersects with an angled extension region 1456 of the flange 1414 which couples the curved extension 1430 to the planar face 1428. A second pivot point may be formed at the flange/arm transition 1406, as described with respect to the first embodiment of the trumpet arm 402 of FIG. 12. Similar to illustration 1250, the first pivot point and the second pivot point are both rigid when the arm section 1422 experiences deflection in a first, downward direction (e.g., towards a driving surface) due to the internal buttresses 1408 being in compression and the curved extension 1430 being in tension, and similar to illustration 1200 the first pivot point and the second pivot point are both rigid when the arm section experiences deflection in a second, upward direction (e.g., away from the driving surface) due to the internal buttresses 1408 being in tension and the curved extension 1430 being in compression.

Both the first perspective view 1400 and the second perspective view 1450 show geometry of the housing 1412, wherein the arm section 1422 has a rectangular shape which extends along the arm length 1432, and the outlet 1420 has an annular shape. The arm section 1422 may gradually transition into the outlet 1420, such that the rectangular shape smoothly transitions to the annular shape without sharp (e.g., angled) intersections. The rectangular shape of the arm section 1422 may provide space in the interior 1410 of the trumpet arm 1402 for internal buttresses 1408 to be positioned and for positioning an axle shaft (e.g., the axle shaft 115, 117) therein. The arm section 1422 is further shaped to enable mounting of suspension packages having different shapes and sizes (e.g., from different manufacturers) thereon. The internal buttresses 1408 may partially extend into the outlet 1420, as further described with respect to FIGS. 17 and 20. The annular shape of the outlet 1420 may enable the axle shaft to be positioned therein without being in contact with the housing 1412. The annular shape of the outlet 1420 may further enable a spindle (e.g., the first spindle 224, the second spindle 226) to be coupled thereto. In other embodiments, the outlet 1420 may be directly coupled to a non-rotating portion of a drive wheel. In other embodiments of the trumpet arm 1402 (e.g., as described with respect to FIG. 13) may have a different shaped cross section, which may be configured to enable mounting different suspension packages thereon and/or integration of the trumpet arm 1402 in different sizes and shapes of e-axle for different vehicle types, for example.

Figure 15:
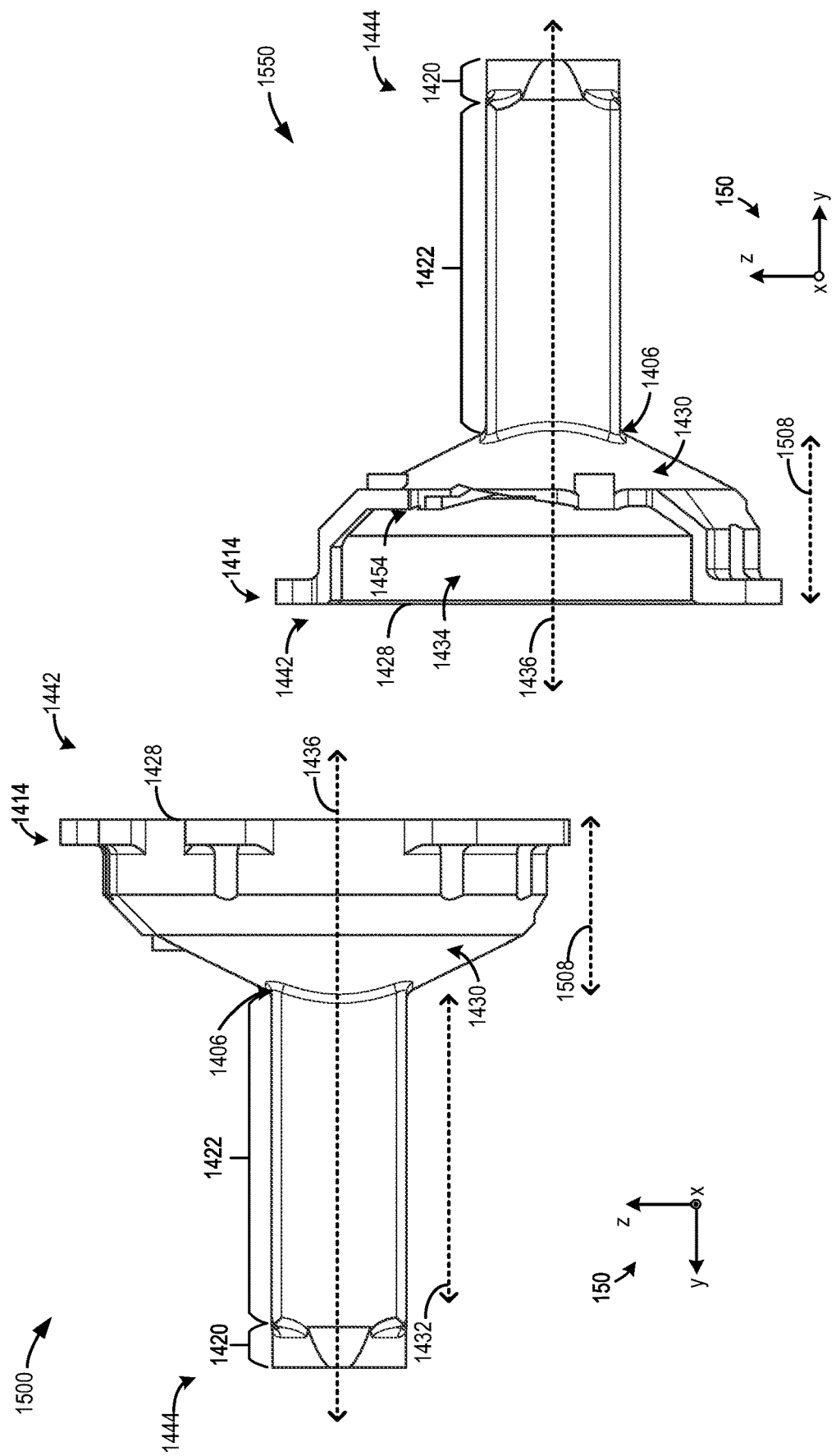
FIG. 15 shows a first set of profile views of the trumpet arm with the curved flange of FIGS. 14A and 14B.

Turning to FIG. 15, a first side view 1500 and a second side view 1550 of the second embodiment of the trumpet arm 1402 are shown. Elements of the trumpet arm 1402 which are described with respect to FIGS. 14A and 14B may not be reintroduced, for brevity. The flange 1414 of the trumpet arm 1402 has a flange length 1508, the arm section 1422 has the arm length 1432, and the internal buttresses 1408 extend through at least a first portion of the flange length 1508, the flange/arm transition 1406, and at least a portion of the arm length 1432, as further described with respect to FIGS. 16, 17, and 20.

Figure 16:
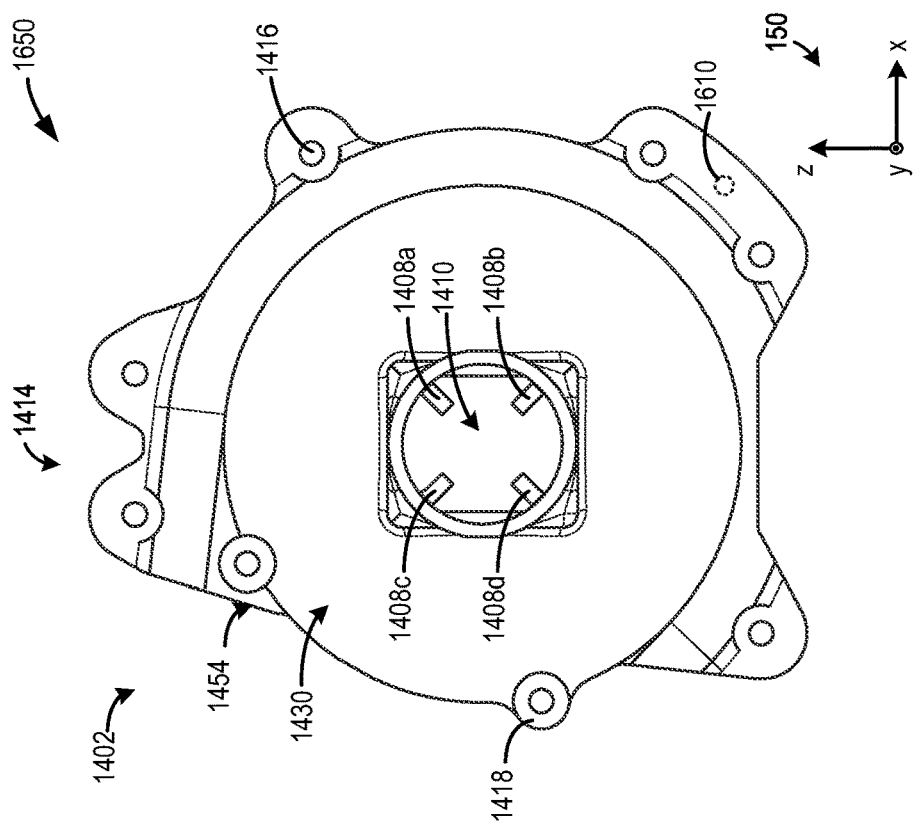
FIG. 16 shows a second set of profile views of the trumpet arm with the curved flange.
Figure 16:
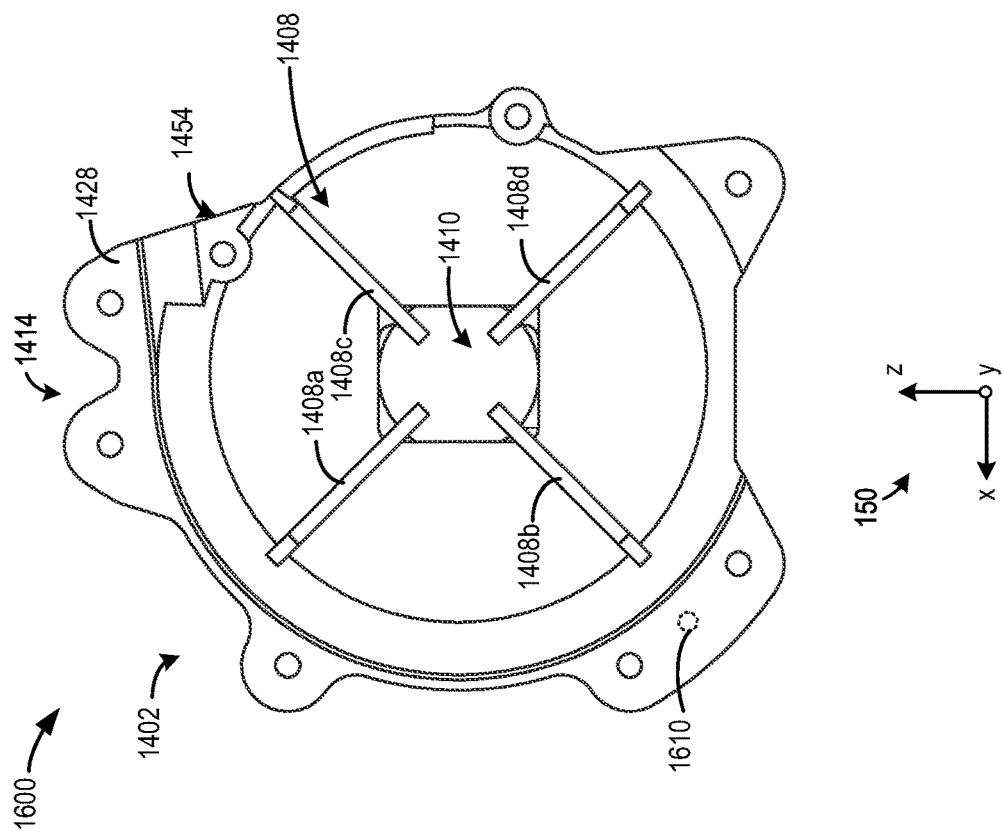

FIG. 16 shows a first profile view 1600 and a second profile view 1650 of the trumpet arm 1402 of FIGS. 14A-15. Elements of the trumpet arm 1402 which are described with respect to FIGS. 14A-15 may not be reintroduced, for brevity. The first profile view 1600 shows the trumpet arm 1402 along the y-axis, looking into an interior area 1434 of the trumpet arm 1402 from the flange 1414 to the outlet 1420 (e.g., from the first end 1442 of the housing 1412 to the second end 1444, as described with respect to FIGS. 14A and 14B). The second profile view 1650 shows the trumpet arm 1402 along the y-axis, looking into the interior 1410 of the trumpet arm 1402 from the outlet 1420 to the flange 1414 (e.g., from the second end 1444 of the housing 1412 to the first end 1442). In some embodiments, the trumpet arm 1402 includes one or more dowel holes 1610 disposed about a perimeter and extending through a thickness of the planar face 1428. The one or more dowel holes 1610 may be configured to receive a dowel extension, for example, from a gearbox housing and/or an electric machine housing, to assist in positioning the trumpet arm 1402 with respect thereto. The one or more dowel holes 1610 may be circular in some embodiments, and may be the same size, a larger size, or a smaller size than the multiple through holes 1416.

As described with respect to FIGS. 14A and 14B, the internal buttresses 1408 have an "x" configuration formed of four legs (e.g., a first leg 1408a, a second leg 1408b, a third leg 1408c, and a fourth leg 1408d) coupling the internal buttresses 1408 to arm section 1422 and to the curved extension 1430. The "x" configuration may be visualized in the first profile view 1600 and the second profile view 1650 of FIG. 16. Configuration of the internal buttresses 1408 in the "x" configuration may enable the internal buttresses 1408 to react to both vertical and horizontal forces and torsional forces on the trumpet arm 1402, and thus on the internal buttresses 1408. For example, the internal buttresses 1408 may experience vertical forces when a vehicle having the e-axle which uses the trumpet arm 1402 (e.g., the vehicle 100 of FIG. 1) travels over protrusions and/or depressions in a driving surface (e.g., speed bumps, potholes). The internal buttresses 1408 may experience horizontal forces and torsional forces when the vehicle brakes and/or accelerates. As further described with respect to FIGS. 14A and 14B, the internal buttresses 1408 and the curved extension 1430, which may function similarly to the external buttresses (gusset, trusses) 426 of the first embodiment of the trumpet arm 402, may enable pivot points of the trumpet arm 1402 to remain rigid when the trumpet arm experiences vertical and/or horizontal forces (e.g., deflection of the trumpet arm), which may reduce degradation of the trumpet arm 1402, especially at the flange/arm transition 1406. The second embodiment of the trumpet arm 1402 may also have different configurations of the internal buttresses 1408. For example, the internal buttresses 1408 may include more than or less than four legs, and the legs may be in a "y" configuration, a "+" configuration, and so on as described with respect to FIG. 13.

FIG. 17 shows a cross section side view 1700 of the trumpet arm 1402, the sectioning axis indicated by line 1750 of FIG. 14B. Elements of the trumpet arm 1402 which are described with respect to FIGS. 14A-16 may not be reintroduced, for brevity. FIG. 17 illustrates an embodiment of a configuration of the internal buttresses 1408 in the housing 1412 of the trumpet arm 1402. In the embodiment of the trumpet arm 1402, the internal buttresses 1408 include four legs in an "x" configuration, as described above. The third leg 1408c and the fourth leg 1408d are shown in FIG. 17, and it is to be understood that the first leg 1408a and the second leg 1408b have the same positioning as described with respect to the third leg 1408c and the fourth leg 1408d, respectively, reflected over the line 1750. Each of the third leg 1408c and the fourth leg 1408d extend along a first portion 1708 of the flange length 1508 and an entirety of the arm length 1432. The third leg 1408c and the fourth leg 1408d may further extend a first length 1710 into the outlet 1420. The third leg 1408c and the fourth leg 1408d extend along the curved extension 1430 of the flange 1414 at an angle which is parallel to a curvature of an exterior surface 1438 of the curved extension 1430 for the first portion 1708 of the flange length 1508. At the flange/arm transition 1406, a shape of each of the third leg 1408c and the fourth leg 1408d transitions from the angle parallel to the curved extension 1430 to a horizontal extension which is parallel to the arm section 1422. The horizontal extension extends for a third portion 1714 of the arm length 1432. The third leg 1408c and the fourth leg 1408d both divert away from the central axis 1436 of the trumpet arm 1402, towards walls of the arm section 1422, for a fourth portion 1716 of the arm length 1432 and the outlet 1420. In this way, the configuration of the third leg 1408c and the fourth leg 1408d, and thus, of the four legs of the internal buttresses 1408, may provide rigidity and resistance to degradation at the flange/arm transition 1406, along the arm length 1432, and at the transition between the arm section 1422 and the outlet 1420. As described with respect to FIG. 13, different embodiments of the internal buttresses 1408 may include more than or less than four legs which are oriented in a different configuration than the "x" configuration.

The flange 1414 is configured to provide a rectangular envelope for positioning electric axle components in an e-axle. The planar face 1428 may be a face on the first end 1442 of a plate or other planar structure, in some embodiments. The curved extension 1430 is coupled to and/or continuous with, and extends from the plate or planar structure having the planar face 1428 in a direction away from the planar face 1428 (e.g., towards the second end 1444). As described with respect to FIGS. 14A-15, the curved extension 1430 has a dome-like shape with a cutout 1454, where the interior area 1434 of the flange 1414 decreases from the first end 1442 towards the flange/arm transition 1406. Described another way, the flange 1414 has a concave shape where a first diameter 1720 is positioned at the first end 1442 of the trumpet arm 1402 and may be coupled to electric axle components, and a second diameter 1722 of the concave shape is positioned at the flange/arm transition 1406, the first diameter 1720 being greater than the second diameter 1722. The curved extension 1430 may function as external buttresses which provide rigidity and resistance to degradation due to stress.

The arm length 1432 and the shape (e.g., cross section) of the arm section 1422 may be configured to enable mounting or other forms of coupling of different suspension mounting packages to the arm section 1422. Different suspension mounting packages may be designed by the same or different manufacturers than those who manufacture the trumpet arm 1402, thus the arm section 1422 is sized to sufficiently accommodate different shapes and sizes of suspensions mounting packages. In some embodiments, a suspension mounting package may be coupled to the trumpet arm 1402 along parts of or all of the arm length 1432. For example, a suspension mounting package may be coupled to the trumpet arm 1402 along the third portion 1714 of the arm section 422 and not coupled to the trumpet arm 1402 at the fourth portion 1716 of the arm length 432. The cutout 1454 of the flange 1414 may also provide space for gear covers to be positioned. For example, at least a portion of a gear cover may extend into the flange length 1508 from the arm length 1432 through the cutout 1454. As described herein with respect to FIG. 13, different embodiments of the trumpet arm may have differently shaped arm sections (e.g., circular cross section, hour glass cross section, and so on), all of which may be configured to accommodate multiple different suspension mounting packages.

FIG. 18 shows a perspective view 1800 of the trumpet arm 1402, as described with respect to FIGS. 14A-17, with a spindle 1826 coupled to the trumpet arm 1402 at the outlet 1420. The spindle 1826 may be an example of the first spindle 224 or the second spindle 226, as described with respect to FIGS. 1-3. The spindle 1826 is coupled to the trumpet arm 1402 at a first end 1842 of the spindle 1826, and a drive wheel (not shown) may be coupled to the spindle 1826 at a second end 1844 of the spindle 1826, opposite the first end 1842 of the spindle 1826. The spindle 1826 may be coupled to the trumpet arm 1402 via friction welding, for example. As described with respect to FIGS. 1-3, an axle shaft which provides rotational motion to drive wheels from a rotational power source (e.g., the electric machine 106) may pass through the interior 1410 of the trumpet arm 1402 and through an interior 1810 of the spindle 1826 to couple to a drive wheel. In some embodiments, the spindle 1826 may be coupled to a non-rotatable element of the drive wheel. In other embodiments, the spindle 1826 may be adjacent to and axially aligned with a center of the drive wheel, but may not be in contact with the drive wheel. In some embodiments, the axle shaft may protrude out of the second end 1844 of the spindle 1826, where the axle shaft may be coupled to the drive wheel and the spindle 1826 is not in contact with the drive wheel. FIG. 19 shows a side view 1900 of the trumpet arm 1402, as described with respect to FIG. 18, with the spindle 1826 coupled to the trumpet arm 1402 at the outlet 1420.

FIG. 20 shows a cross section side view 2000 of the trumpet arm 1402 with the spindle 1826 coupled thereto, as described with respect to FIG. 18-19. The first cross section side view 2000 sections the trumpet arm 1402 with the spindle 1826 along the line 2050, shown in FIG. 18. As described with respect to FIGS. 14A-19, legs of the internal buttresses 1408 extend from the flange 1414, through the flange/arm transition 1406, and along the arm length 1432 of the arm section 1422. In the embodiment of the trumpet arm 1402 shown in FIG. 20, arms of the internal buttresses 1408 (e.g., the first leg 1408a and the second leg 1408b) extend in an "x" configuration towards the central axis 1436 of the trumpet arm 1402. Described another way, each of the first leg 1408a and the second leg 1408b (and the third leg 1408c and the fourth leg 1408d, not shown in FIG. 20) extend from the curved extension 1430 at an angle, towards the central axis 1436 of the trumpet arm 1402 in such a way that there is space between each of the legs of the internal buttresses, as well as space between the internal buttresses 1408 and the housing 1412 (e.g., walls of the arm section 1422). Described another way, the legs of the internal buttresses 1408 may, for the fourth portion 1716 of the arm length 1432 and while still being in the "x" configuration, flare away from the central axis 1436 of the trumpet arm 1402. This configuration may provide strength and rigidity to the arm section 1422 while providing space for positioning of the axle shaft. As described herein, the internal buttresses 1408 may extend into the outlet 1420, and may not extend into the spindle 1826. The internal buttresses 1408 thus provide rigidity and resistance to degradation of the trumpet arm 1402 at the flange 1414, at the flange/arm transition 1406, and along the arm length 1432 of the arm section 1422.

The technical effect of the trumpet arm having internal buttresses and a flange with a planar face is that a strength, rigidity, and resistance to stress-based degradation of the trumpet arm at the flange/arm transition is increased compared to conventional axle arms. A useable lifespan of the trumpet arm may be increased. Further, a usability of the trumpet arm is increased in e-axles, as the planar face of the flange provides a rectangular envelope in which electric axle components may be mounted. Additionally, the trumpet arm described herein may have different configurations of legs of the internal buttresses and cross-section of the arm section, which provides space for mounting of different suspension packages thereon, as well as provide a sufficient and desirable strength of the trumpet arm for use in different systems, such as passenger and/or heavy duty electric vehicles.

The disclosure also provides support for a trumpet arm for an axle, comprising: a housing with an arm section extending an arm length, the arm section having an outlet at a first end, and a flange with a planar face at a second end opposite the first end, and internal buttresses positioned in an interior of the housing and extending through at least a first portion of a flange length of the flange, a flange/arm transition at which the flange transitions into the arm section, and at least a portion of the arm length. In a first example of the system, the internal buttresses include one or more legs which extend from walls of the housing towards the interior of the housing in an "x" configuration, a "y" configuration, a horizontal configuration, a vertical configuration, a "+" configuration, a curved configuration, or a combination of two or more of the aforementioned configurations. In a second example of the system, optionally including the first example, a cross section of the arm section is a box, a rectangle, a circle, an oval, an hourglass, or a combination of two or more of the aforementioned shapes. In a third example of the system, optionally including one or both of the first and second examples, the system further comprises: external buttresses extending a second portion of the flange length to the flange/arm transition, and wherein endpoints of the external buttresses are offset from endpoints of the internal buttresses. In a fourth example of the system, optionally including one or more or each of the first through third examples, the flange includes an angled extension from the planar face to the flange/arm transition. In a fifth example of the system, optionally including one or more or each of the first through fourth examples, the flange includes a curved extension from the planar face to the flange/arm transition. In a sixth example of the system, optionally including one or more or each of the first through fifth examples, the system further comprises: a spindle coupled to the housing at the outlet of the arm section. In a seventh example of the system, optionally including one or more or each of the first through sixth examples, a cross section of the arm section maintains a constant profile throughout the arm length. In an eighth example of the system, optionally including one or more or each of the first through seventh examples, the system further comprises: multiple through holes around a perimeter of the flange, wherein one or more of the multiple through holes includes a raised bolt pad. In a ninth example of the system, optionally including one or more or each of the first through eighth examples, an interior area of the flange decreases from the first end towards the flange/arm transition. In a tenth example of the system, optionally including one or more or each of the first through ninth examples, the housing and the internal buttresses are formed of cast steel, cast aluminum, and/or nodular iron. In an eleventh example of the system, optionally including one or more or each of the first through tenth examples, the housing and the internal buttresses are formed as various cast, stamped, or machined components fixtured and assembled as a weldment.

The disclosure also provides support for an e-axle, comprising: an electric machine, a first trumpet arm, and a second trumpet arm, wherein at least one of the first trumpet arm and the second trumpet arm comprise a housing with an arm section extending an arm length, a flange with a planar face at a first end of the arm length, and internal buttresses positioned in an interior of the housing, where the first trumpet arm and the second trumpet arm are each configured to couple to the electric machine via a respective flange. In a first example of the system, internal buttresses of the first trumpet arm and the second trumpet arm extend through at least a first portion of a flange length of the flange, a flange/arm transition at which the flange transitions into the arm section, and at least a portion of the arm length. In a second example of the system, optionally including the first example, the system further comprises: a differential lock/axle disconnect assembly having a shift fork and a sliding collar positioned in the flange of the first trumpet arm or the second trumpet arm, the shift fork and the sliding collar configured to mate with a mating clutch of the electric machine, and where the differential lock/axle disconnect assembly is pneumatically, hydraulically, electro-mechanically, or magnetically operated. In a third example of the system, optionally including one or both of the first and second examples, the differential lock/axle disconnect assembly includes a differential lock/axle disconnect actuator which extends through a flange length of the flange of the first trumpet arm or the second trumpet arm. In a fourth example of the system, optionally including one or more or each of the first through third examples, the system further comprises: one or more locating dowels which extend from the flange of each of the first trumpet arm and the second trumpet arm to the electric machine, and/or one or more pilot diameters which extend into the flange of each of the first trumpet arm and the second trumpet arm and are configured to receive one or more connectors of the electric machine. In a fifth example of the system, optionally including one or more or each of the first through fourth examples, the system further comprises: a suspension package coupled to at least one of the first trumpet arm and the second trumpet arm at the respective arm section(s). In a sixth example of the system, optionally including one or more or each of the first through fifth examples, the system further comprises: a first spindle and a second spindle coupled to each of the first trumpet arm and the second trumpet arm, respectively, at a second end of the arm length opposite the first end of the arm length and at a first spindle end of the respective spindle, and a first wheel and a second wheel coupled to each of the first spindle and the second spindle, respectively, at a second spindle end of the respective spindle, opposite the first spindle end of the spindle.

The disclosure also provides support for an axle housing, comprising: an arm section extending an arm length, a flange extending a flange length and having a planar face at a first end of the flange length, the flange coupled to the arm section at a flange/arm transition, internal buttresses positioned in an interior of the flange and the arm section, the internal buttresses extending at least a portion of the arm length of the arm section and at least a first portion of the flange length, external buttresses positioned on an exterior of the flange, the external buttresses extending at least a second portion of the flange length, a pair of first pivot points at the planar face of the flange, and a pair of second pivot points at the flange/arm transition, wherein: the pair of first pivot points and the pair of second pivot points are both rigid when the arm section experiences deflection in a first, downward direction due to, in a top half of the axle housing, the internal buttresses being in compression and the external buttresses being in tension, and in a bottom half of the axle housing the internal buttresses being in tension and the external buttresses being in compression, and the pair of first pivot points and the pair of second pivot points are both rigid when the arm section experiences deflection in a second, upward direction due to, in the top half of the axle housing, the internal buttresses being in tension and the external buttresses being in compression and in the bottom half of the axle housing, the internal buttresses being in compression and the external buttresses being in tension.

FIGS. 1-20 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A trumpet arm for an axle, comprising:
a housing with an arm section extending an arm length, the arm section having an outlet at a first end, and a flange with a planar face at a second end opposite the first end; and internal buttresses positioned in an interior of the housing and extending through at least a first portion of a flange length of the flange, a flange/arm transition at which the flange transitions into the arm section, and at least a portion of the arm length, wherein the housing and the internal buttresses are formed as various cast, stamped, or machined components fixtured and assembled as a weldment.

2. The trumpet arm of claim 1, wherein the internal buttresses include one or more legs which extend from walls of the housing towards the interior of the housing in an "x" configuration, a "y" configuration, a horizontal configuration, a vertical configuration, a "+" configuration, a curved configuration, or a combination of two or more of the aforementioned configurations.

3. The trumpet arm of claim 1, wherein a cross section of the arm section is a box, a rectangle, a circle, an oval, an hourglass, or a combination of two or more of the aforementioned shapes.

4. The trumpet arm of claim 1, further comprising external buttresses extending a second portion of the flange length to the flange/arm transition, and wherein endpoints of the external buttresses are offset from endpoints of the internal buttresses.

5. The trumpet arm of claim 1, wherein the flange includes an angled extension from the planar face to the flange/arm transition.

6. The trumpet arm of claim 1, wherein the flange includes a curved extension from the planar face to the flange/arm transition.

7. The trumpet arm of claim 1, further comprising a spindle coupled to the housing at the outlet of the arm section.

8. The trumpet arm of claim 1, wherein a cross section of the arm section maintains a constant profile throughout the arm length.

9. The trumpet arm of claim 1, further comprising multiple through holes around a perimeter of the flange, wherein one or more of the multiple through holes includes a raised bolt pad.

10. The trumpet arm of claim 1, wherein an interior area of the flange decreases from the first end towards the flange/arm transition.

11. The trumpet arm of claim 1, wherein the housing and the internal buttresses are formed of cast steel, cast aluminum, and/or nodular iron.

12. An e-axle, comprising:
an electric machine;
a first trumpet arm;
a second trumpet arm, wherein the first trumpet arm and the second trumpet arm each comprise a housing with an arm section extending an arm length, a flange with a planar face at a first end of the arm length, and internal buttresses positioned in an interior of the housing, where the first trumpet arm and the second trumpet arm are each configured to couple to the electric machine via their respective flange; and
one or more locating dowels which extend from the flange of each of the first trumpet arm and the second trumpet arm to the electric machine, and/or one or more pilot diameters which extend into the flange of each of the first trumpet arm and the second trumpet arm and are configured to receive one or more connectors of the electric machine.

13. The e-axle of claim 12, wherein internal buttresses of the first trumpet arm and the second trumpet arm extend through at least a first portion of a flange length of the flange, a flange/arm transition at which the flange transitions into the arm section, and at least a portion of the arm length.

14. The e-axle of claim 12, further comprising a differential lock/axle disconnect assembly having a shift fork and a sliding collar positioned in the flange of the first trumpet arm or the second trumpet arm, the shift fork and the sliding collar configured to mate with a mating clutch of the electric machine, and where the differential lock/axle disconnect assembly is pneumatically, hydraulically, electro-mechanically, or magnetically operated.

15. The e-axle of claim 14, wherein the differential lock/axle disconnect assembly includes a differential lock/axle disconnect actuator which extends through a flange length of the flange of the first trumpet arm or the second trumpet arm.

16. The e-axle of claim 12, further comprising a suspension package coupled to at least one of the first trumpet arm and the second trumpet arm at the respective arm section(s).

17. The e-axle of claim 12, further comprising a first spindle and a second spindle coupled to each of the first trumpet arm and the second trumpet arm, respectively, at a second end of the arm length opposite the first end of the arm length and at a first spindle end of the respective spindle, and a first wheel and a second wheel coupled to each of the first spindle and the second spindle, respectively, at a second spindle end of the respective spindle, opposite the first spindle end of the spindle.

18. An axle housing, comprising:
an arm section extending an arm length;
a flange extending a flange length and having a planar face at a first end of the flange length, the flange coupled to the arm section at a flange/arm transition;
internal buttresses positioned in an interior of the flange and the arm section, the internal buttresses extending at least a portion of the arm length of the arm section and at least a first portion of the flange length;
external buttresses positioned on an exterior of the flange, the external buttresses extending at least a second portion of the flange length;
a pair of first pivot points at the planar face of the flange; and
a pair of second pivot points at the flange/arm transition, wherein:
the pair of first pivot points and the pair of second pivot points are both rigid when the arm section experiences deflection in a first, downward direction due to, in a top half of the axle housing, the internal buttresses being in compression and the external buttresses being in tension, and in a bottom half of the axle housing the internal buttresses being in tension and the external buttresses being in compression; and
the pair of first pivot points and the pair of second pivot points are both rigid when the arm section experiences deflection in a second, upward direction due to, in the top half of the axle housing, the internal buttresses being in tension and the external buttresses being in compression and in the bottom half of the axle housing, the internal buttresses being in compression and the external buttresses being in tension.

* * * * *